(12) United States Patent
Shibahata et al.

(10) Patent No.: US 11,499,891 B2
(45) Date of Patent: Nov. 15, 2022

(54) TIRE TESTER WITH TIRE HOLDING UNITS

(71) Applicant: SHOWA CORPORATION, Saitama (JP)

(72) Inventors: Yasuji Shibahata, Tochigi (JP); Tatsuru Niihara, Tochigi (JP); Miki Isshiki, Tochigi (JP); Shigeharu Shibahata, Tochigi (JP); Hirokazu Fujimoto, Tochigi (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 176 days.

(21) Appl. No.: 16/989,281

(22) Filed: Aug. 10, 2020

(65) Prior Publication Data

US 2020/0371000 A1     Nov. 26, 2020

Related U.S. Application Data

(63) Continuation of application No. PCT/JP2018/013639, filed on Mar. 30, 2018.

(30) Foreign Application Priority Data

Mar. 20, 2018   (JP) .............................. JP2018-053544

(51) Int. Cl.
    *G01M 17/02*         (2006.01)
(52) U.S. Cl.
    CPC ................. *G01M 17/021* (2013.01)
(58) Field of Classification Search
    CPC .. G01M 17/021; G01M 17/00; G01M 17/022; G01M 17/02
    See application file for complete search history.

(56) References Cited

U.S. PATENT DOCUMENTS 3,538,742 A    11/1970   Benning
4,726,603 A    2/1988   Sugiyama et al.
(Continued)

FOREIGN PATENT DOCUMENTS

CN       102341283 A      2/2012
CN       104729863 A      6/2015
(Continued)

OTHER PUBLICATIONS

Chinese Office Action for the related Chinese Patent Application No. 201880088770.2 dated Oct. 28, 2021.
(Continued)

*Primary Examiner* — Eric S. McCall
*Assistant Examiner* — Timothy P Graves
(74) *Attorney, Agent, or Firm* — Kenealy Vaidya LLP

(57) ABSTRACT

A tire tester includes a plurality of tire holding units attached to a movable member or a towed member and each configured to detachably hold a tire, and one or more load measuring units for measuring a load acting on the tire. The plurality of tire holding units include a first tire holding unit configured to detachably hold a first tire, and one or more second tire holding units each configured to detachably hold a second tire. The second tire holding unit holds the second tire to generate a force opposite to a lateral component force generated by steering the first tire. The tire holding units are arranged such that at least one tire holding unit is disposed on each right and left side of the movable member or the towed member with respect to a center line passing through a lateral center thereof.

18 Claims, 15 Drawing Sheets

(56) References Cited

U.S. PATENT DOCUMENTS

| | | |
|---|---|---|
| 4,835,714 A | 5/1989 | Sano et al. |
| 4,858,950 A | 8/1989 | Kajiwara et al. |
| 4,903,984 A | 2/1990 | Kajiwara et al. |
| 2003/0209061 A1 | 11/2003 | Schoeninger |
| 2004/0255661 A1* | 12/2004 | Nagai ................ G01M 17/065 73/146 |
| 2007/0204683 A1 | 9/2007 | Halliday |
| 2007/0256484 A1 | 11/2007 | Imanishi et al. |
| 2007/0283744 A1 | 12/2007 | Balkwill et al. |
| 2009/0173137 A1 | 7/2009 | Halliday |
| 2012/0053786 A1* | 3/2012 | Denimal ................ B60T 8/172 701/36 |
| 2013/0158798 A1* | 6/2013 | Igarashi ................ B60W 10/22 701/41 |
| 2016/0280259 A1* | 9/2016 | Ishikawa ................ B62D 3/12 |

FOREIGN PATENT DOCUMENTS

| | | |
|---|---|---|
| DE | 35 09 440 A1 | 9/1985 |
| DE | 36 29 881 A1 | 3/1987 |
| DE | 20 2007 006 241 U1 | 8/2007 |
| JP | S57-124231 A | 8/1982 |
| JP | H06-347378 A | 12/1994 |
| JP | 2007-3416 A | 1/2007 |
| JP | 2011-137783 A | 7/2011 |
| JP | 2013-156087 A | 8/2013 |
| JP | 2013-167575 A | 8/2013 |
| WO | 2003/010505 A1 | 2/2003 |
| WO | 2006/040855 A1 | 4/2006 |
| WO | 2007/106204 A2 | 9/2007 |

OTHER PUBLICATIONS

International Search Report and Written Opinion of the International Search Report for PCT/JP2018/013639 dated Jul. 3, 2018.
Japanese Office Action for the related Japanese Patent Application No. 2018-053544 dated Jun. 21, 2018.
Written Amendment for the related Japanese Patent Application No. 2018-053544 dated Aug. 1, 2018.
Written Opinion for the related Japanese Patent Application No. 2018-053544 dated Aug. 1, 2018.
German Office Action for the related German Patent Application No. 112018007306.8 dated Aug. 12, 2021.
Chinese Office Action for the related Chinese Patent Application No. 201880088770.2 dated Jul. 20, 2022.
Kuangli Li, "Skills Training for Car Maintenance Workers", Jindun Publishing House, 1st edition, Jan. 2009, pp. 343-344.

* cited by examiner

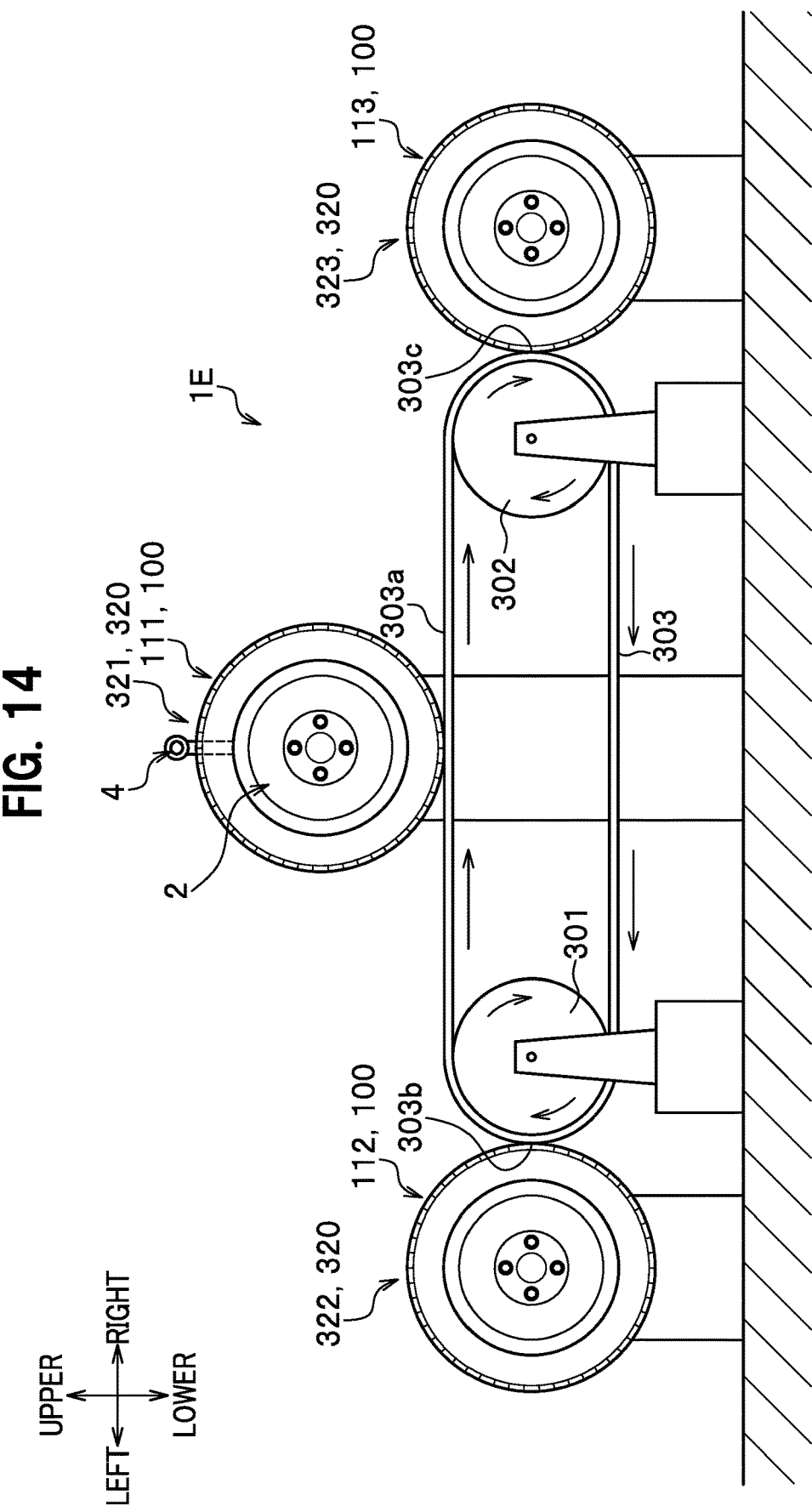

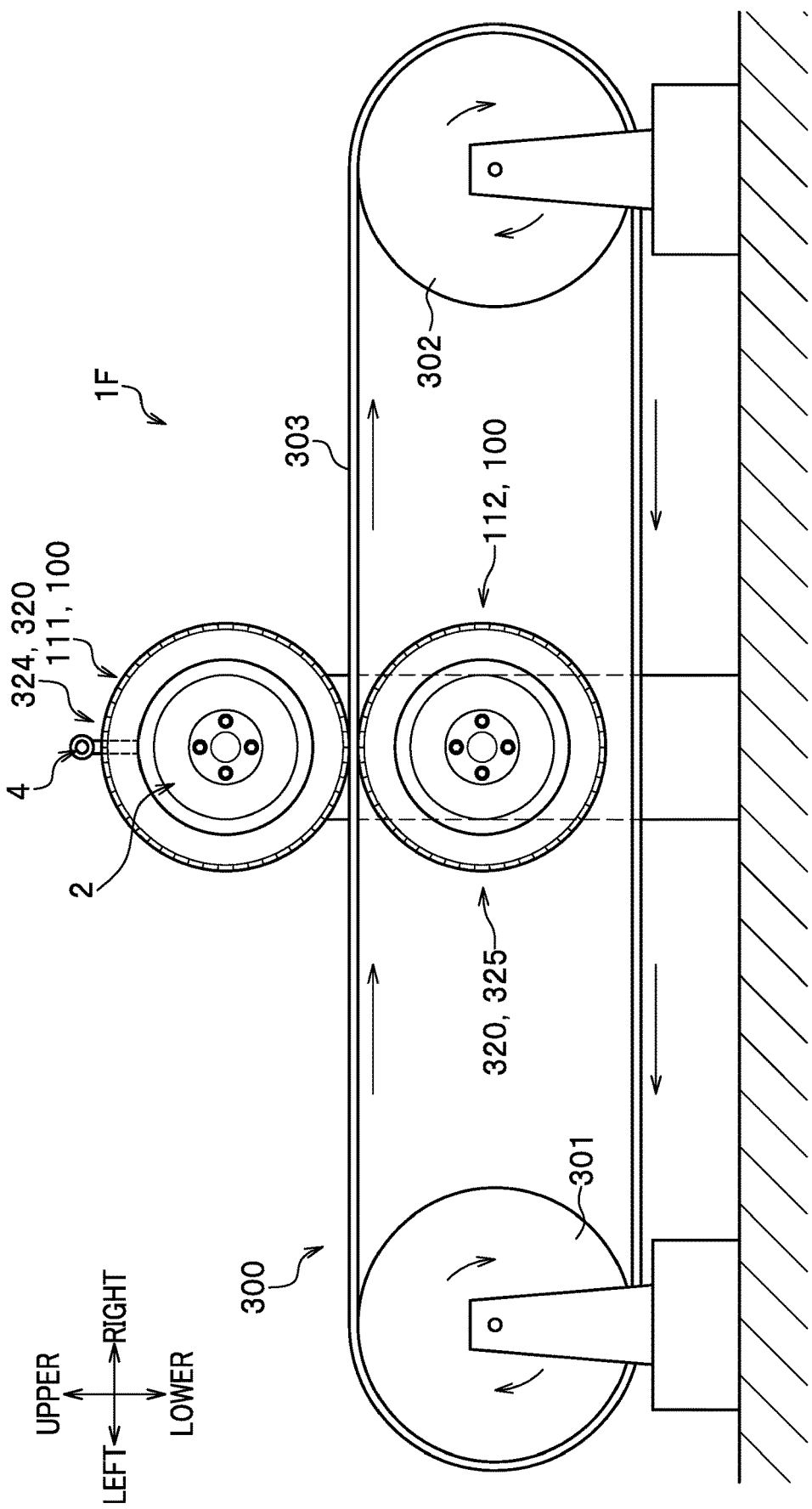

TIRE TESTER WITH TIRE HOLDING UNITS

CROSS-REFERENCE TO RELATED APPLICATIONS

This application is a continuation application based on PCT/JP2018/013639, filed on Mar. 30, 2018, claiming priority based on Japanese Patent Application No. 2018-053544, filed in Japan on Mar. 20, 2018, the contents of which are incorporated herein by reference.

TECHNICAL FIELD

The present invention relates to a tire tester.

RELATED ART

Tire testers for determining tire characteristics measure a load applied to a tire while the tire is rotating.

Therefore, a tire tester disclosed in the following Patent Literature Document 1 (JP 2013-156087A) and not providing a propulsive force is installed in a movable member such as a vehicle. The tire tester then measures a load applied to a tire when the tire is rotating during traveling of the movable member.

An installation-type tire tester disclosed in the following Patent Literature Document 2 (JP 2011-137783A) causes a tire to rotate using a tire rotating device. The tire rotating device includes a pair of drums and an endless belt looped around the pair of drums, and is configured such that when the belt rotates by the rotation of the pair of drums, the tire disposed on the belt rotates.

SUMMARY OF THE INVENTION

A tire tester steers a tire to measure a lateral force to be applied to the tire. If a movable member is equipped with the tire tester as disclosed in Patent Literature Document 1 and the tire tester imparts a steering angle to the tire, the movable member may travel meanderingly due to a lateral component force acting on the movable member.

It is conceivable that the weight and the size of the movable member may be increased to prevent the movable member from traveling meanderingly even if a lateral component force acts on the movable member. However, to prepare a heavy and upsized movable member makes it impossible to easily carried out a tire test and is thus inconvenient.

Further, the belt of the tire rotating device is rubbing with the tire to generate a reaction force, so that when the tire is steered, a force parallel to the axes of rotation of the drums, that is, a lateral component force is generated as the reaction force. Therefore, if the tire rotating device is used as disclosed in Patent Literature Document 2, the position of the belt may be disadvantageously misaligned or the belt may come off the drums. Further, to prevent the belt of the conventional tire rotating device from being misaligned or coming off the drums, it may be conceivable to adjust the tension of the belt. However, this will require a further operation to adjust the tension of the belt and is thus inconvenient.

In view of the above, there has been a demand to develop a tire tester which can eliminate the above-described inconvenience and can easily perform a tire test.

The present invention has been created to solve this problem and it is an object of the present invention to provide a tire tester capable of performing a tire test with ease.

To solve the above problem, a tire tester according to the present invention comprises a plurality of tire holding units each configured to detachably hold a tire to rotate, wherein the plurality of tire holding units at least comprise a first tire holding unit configured to detachably hold a first tire to rotate, and a second tire holding unit configured to detachably hold a second tire to rotate, and wherein the first tire holding unit holds the first tire to generate a force opposite to a lateral component force generated by steering the second tire.

According to the present invention, it is possible to cancel out a lateral component force acting on a movable member or a towed member to which the tire tester is attached, thereby preventing the movable member or the towed member from traveling meanderingly. Accordingly, a tire test is performed with ease without requiring an upsized and heavy movable member.

Further, it is possible to cancel out a force generated on the belt (lateral component force (force parallel to the axes of rotation of the drums)) by steering a tire held by the tire tester, so that misalignment of the position of the belt can be suppressed. This makes it possible to eliminate the need to adjust the tension of the belt, so that the tire test can be carried out with ease.

BRIEF DESCRIPTION OF THE DRAWINGS

FIG. 14 is a rear view of a tire tester according to a first modification of the fourth embodiment when viewed from the rear side.

FIG. 15 is a rear view of a tire tester according to a second modification of the fourth embodiment when viewed from the rear side.

DETAILED DESCRIPTION OF THE INVENTION

Next, the basic structure of the present invention is described below.

Figure 1:
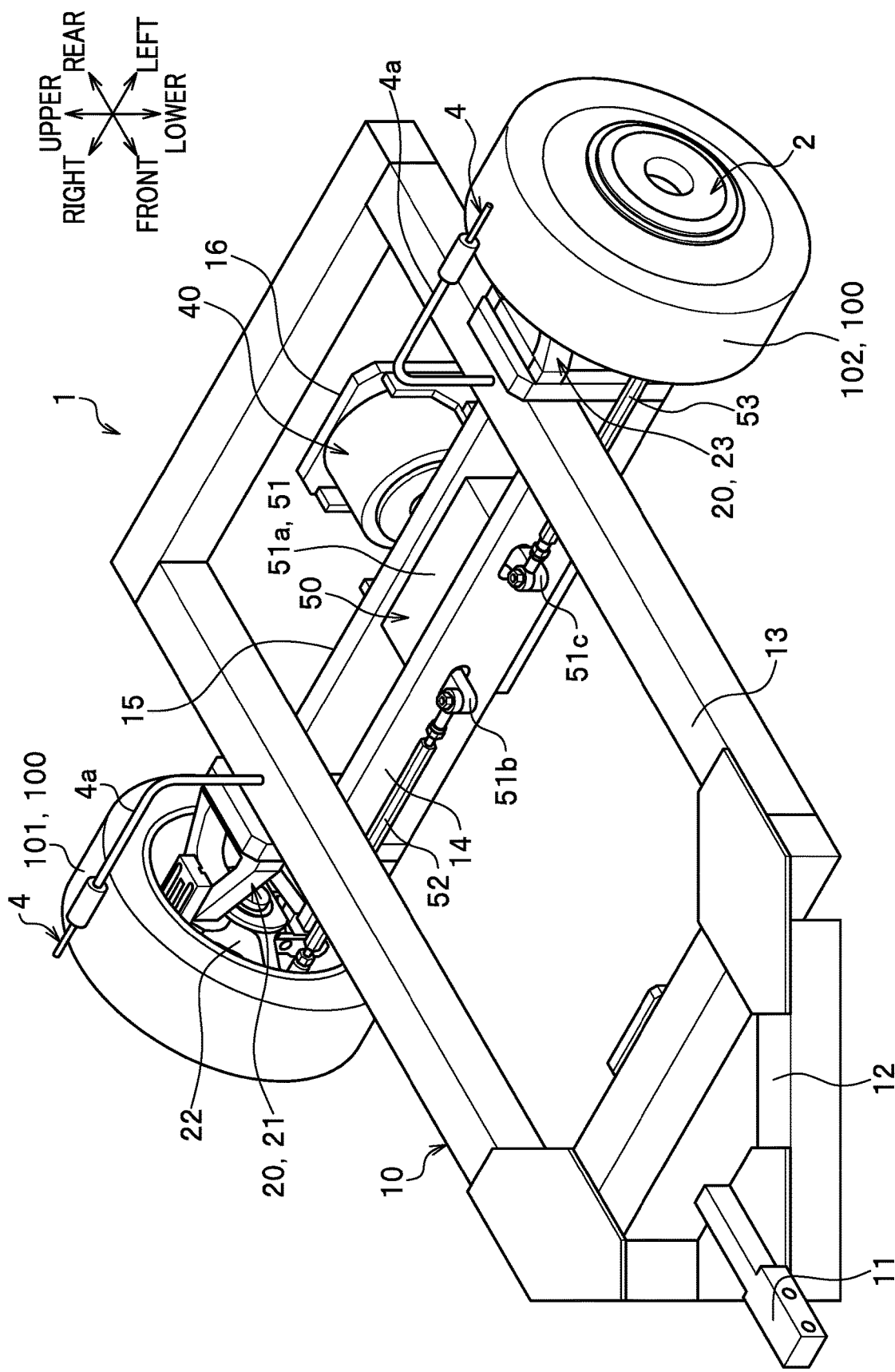
FIG. 1 is a perspective view of a tire tester according to a first embodiment when viewed from above on the front left side.

As seen in FIG. 1, a tire tester 1 according to the present invention includes a plurality of tire holding units 20 each configured to detachably hold a tire 100 to rotate.

The plurality of tire holding units 20 include a first tire holding unit 21 for detachably holding a first tire 101 to rotate, and one second tire holding unit 23 or a plurality of second tire holding units 23 each for detachably holding a second tire 102 to rotate.

The second tire holding unit 23 (or each of the plurality of second tire holding units 23) is configured to hold the second tire 102 to generate a force (see arrow F4 of FIG. 5) opposite to a lateral component force (see arrow F3 of FIG. 5) generated by steering the first tire 101.

With this configuration, it is possible to cancel out a lateral component force acting on a movable member or a towed member on which the tire tester 1 is mounted, thereby preventing the movable member or the towed member from traveling meanderingly.

Explanations are given of first to fourth embodiments, to which the present invention has been adapted in a specific manner. In the description of each of the embodiments, the same or similar components are denoted by the same reference numerals and redundant explanations thereof are omitted.

First Embodiment

Figure 2:
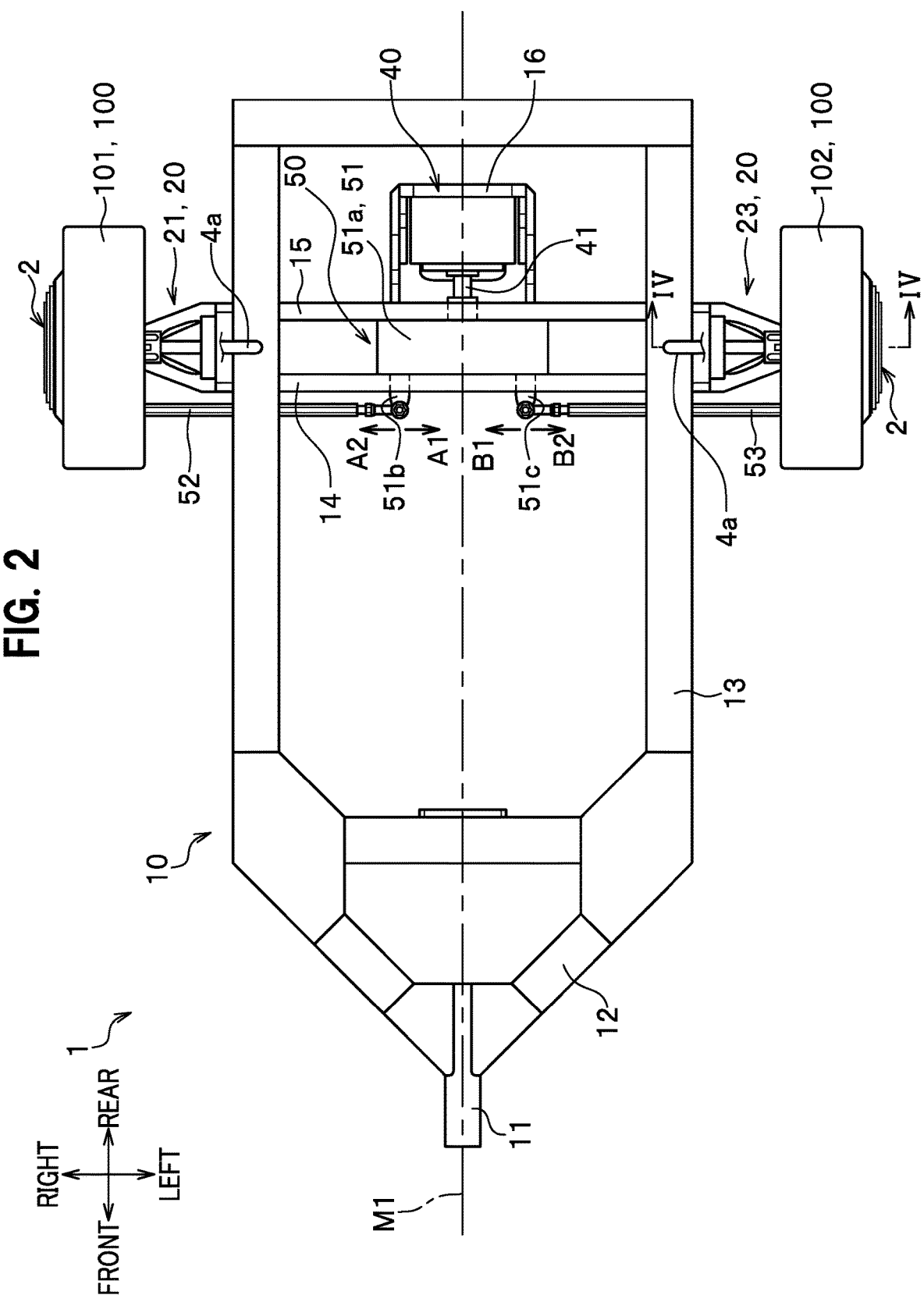
FIG. 2 is a top view of the tire tester according to the first embodiment when viewed from above.

As seen in FIGS. 1 and 2, a tire tester 1 according to a first embodiment is attached to a towed member 10 towed by a movable member (not shown), and includes a plurality of tire holding units 20 each configured to detachably hold a tire 100 to rotate when the movable member travels, an actuator 40 for generating a driving force, and a transmission unit 50 for transmitting the driving force of the actuator 40 to the tire holding units 20.

It should be noted that the movable member may be a self-propelled two-wheel vehicle, a self-propelled three-wheel vehicle, and a self-propelled four-wheel vehicle, for instance.

Further, the tire tester 1 includes a load measuring unit 2 (see FIG. 4) for measuring a force (load) acting on a tire 100, a steering angle meter (toe angle meter; not shown) for measuring a steering angle (toe angle) of the tire 100, a temperature sensor 4 (see FIGS. 1 and 4) for measuring a surface temperature of the tire 100, a pitch sensor (not shown), and a turning lateral acceleration meter (not shown).

As seen in FIGS. 1 and 2, the towed member 10 includes a connecting portion 11 to be detachably connected to a connecting portion of the movable member, a front body 12 bifurcated and extending rearward from the connecting portion 11 and having a generally V-shaped configuration when viewed from above, and a main body 13 disposed rearward of the front body 12 and having a rectangular frame-shaped configuration when viewed from above.

The connecting portion 11, the front body 12, and the main body 13 are respectively formed symmetrically with respect to a center line M1 passing through the lateral center (center in the right-left direction) thereof (see FIG. 2).

The front body 12 and the main body 13 are formed by hollow metallic frames joined by welding at their end portions.

Provided on a lower side of a rear portion of the main body 13 are a pair of long plate members 14, 15 spaced apart from each other in the front-rear direction and extending laterally in the right-left direction, and a support plate 16 extending rearward from the pair of long plate members 14, 15 to support the actuator 40.

As seen in FIG. 1, the plurality of tire holding units 20 include a right tire holding unit 21 attached to the right side of the towed member 10 with respect to the center line M1 at the lateral center of the towed member 10 and configured to hold a right tire 101, and a left tire holding unit 23 attached to the left side of the towed member 10 with respect to the center line M1 and configured to hold a left tire 102. Therefore, according to this embodiment, the tire holding units 20 are arranged such that one tire holding unit 20 is disposed on each right and left side of the movable member or the towed member 10 with respect to the center line M1 at the lateral center of the movable member or the towed member 10.

Further, the right tire holding unit 21 includes a right steering angle adjusting unit 22 capable of adjusting a steering angle of the right tire 101, and the left tire holding unit 23 includes a left steering angle adjusting unit 24 (see FIG. 3) capable of adjusting a steering angle of the left tire 102.

As seen in FIG. 2, the plurality of tire holding units 20 (right tire holding unit 21 and left tire holding unit 23) are arranged symmetrically with respect to the center line M1 at the lateral center of the towed member 10 to which the tire holding units 20 are attached.

The right tire holding unit 21 and the left tire holding unit 23 are formed symmetrically with respect to the center line M1 and have the same structure. Therefore, among the right tire holding unit 21 and the left tire holding unit 23, an explanation is given of the left tire holding unit 23 as a representative example and the explanation of the right tire holding unit 21 is omitted.

Figure 3:
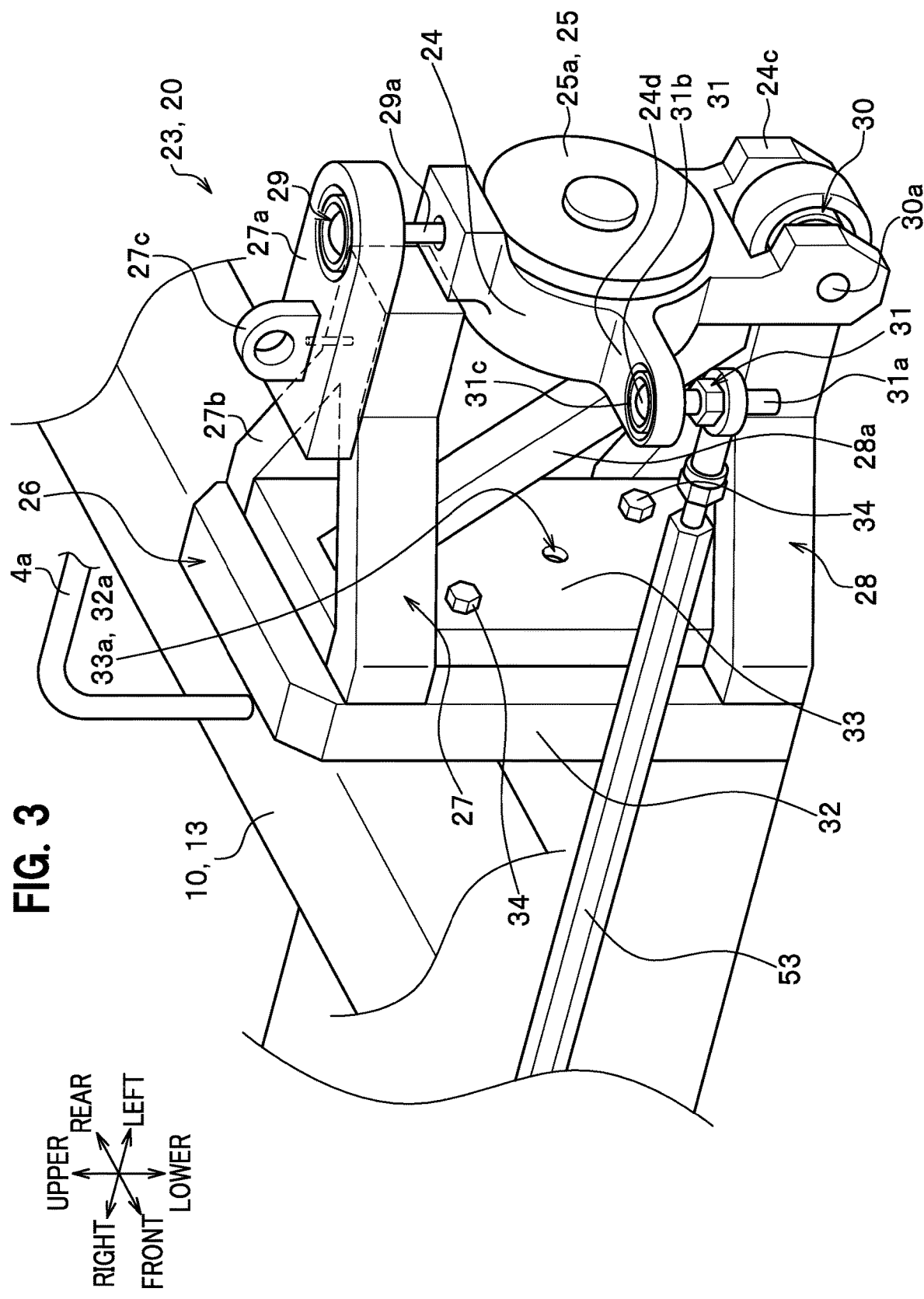
FIG. 3 is an enlarged perspective view showing a peripheral portion of a left tire holding unit according to the first embodiment.
Figure 4:
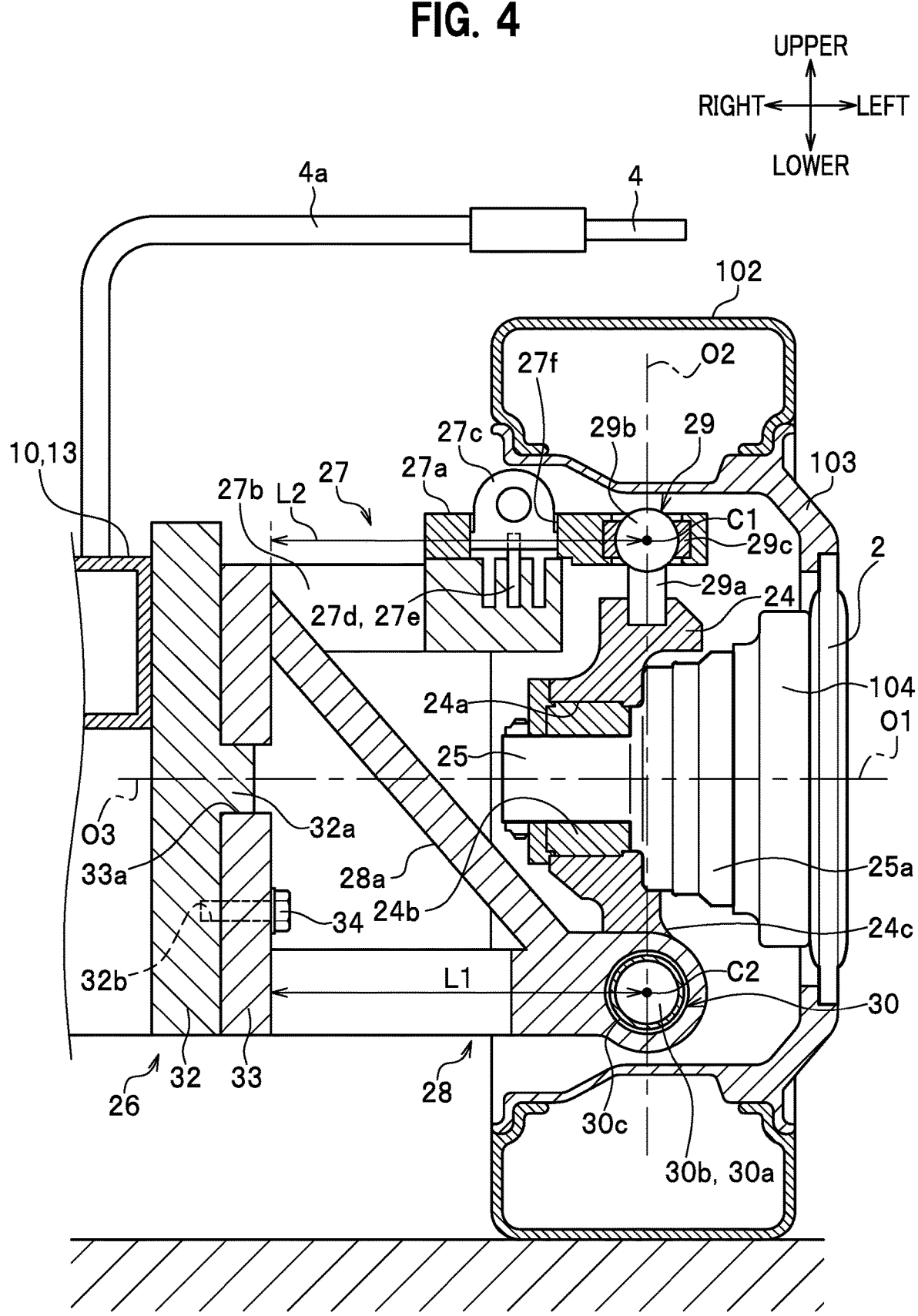
FIG. 4 is a sectional view taken along the line IV-IV of FIG. 2.

As seen in FIGS. 3 and 4, the left tire holding unit 23 includes a fixing portion 26 fixed to a left side portion of the main body 13 of the towed member 10, an upper arm 27 extending leftward from an upper portion of the fixing portion 26, a lower arm 28 extending leftward from a lower portion of the fixing portion 26, and a left steering angle adjusting unit 24 disposed between the upper arm 27 and the lower arm 28.

As seen in FIG. 4, an opening 24a is formed in a central portion of the left steering angle adjusting unit 24. The opening 24a extends through the left steering angle adjusting unit 24 in the right-left direction. Further, an axle 25 is fitted into the opening 24a through a bearing 24b.

The axle 25 is a cylindrical shaft member extending in the lateral direction. A flange 25a is formed on a left end portion of the axle 25. The flange 25a protrudes radially outward of the axle 25.

A hub 104 of a wheel 103 is attached to the flange 25a. Accordingly, the left tire 102 is rotatably supported by the left steering angle adjusting unit 24 around an axis of rotation O1 of the axle 25.

It should be noted that the hub 104 is fastened to the axle 25 by bolts (not shown), so that the left tire 102 is detachably attached to the axle 25.

As seen in FIG. 3, a pair of lower protruding portions 24c are formed on a lower portion of the left steering angle adjusting unit 24. The lower protruding portions 24c protrude downward while being spaced apart from each other in the front-rear direction. A front protruding portion 24d configured to protrude frontward is formed on a front portion of the left steering angle adjusting unit 24.

Further, an upper ball joint 29 is disposed on an upper side of the left steering angle adjusting unit 24. A lower ball joint 30 is disposed between the pair of lower protruding portions 24c. A front ball joint 31 is disposed on the front protruding portion 24d.

As seen in FIG. 4, the upper ball joint 29 includes a ball stud 29a extending upward from an upper portion of the left steering angle adjusting unit 24 and having a sphere 29b formed at the upper end thereof, and an annular socket 29c into which the sphere 29b is rotatably fitted.

The lower ball joint 30 includes a ball stud 30a extending in the front-rear direction between the pair of lower protruding portions 24c and having a sphere 30b disposed at a central portion thereof in the front-rear direction, and an annular socket 30c into which the sphere 30b is rotatably fitted.

As seen in FIG. 3, the front ball joint 31 includes a ball stud 31a extending in the upper-lower direction and supported by a left end portion of a left link portion 53 to be described later and having a sphere 31b formed at the upper end thereof, and an annular socket 31c into which the sphere 31b is rotatably fitted. The socket 31c is supported by the front protruding portion 24d.

The socket 29c of the upper ball joint 29 is fixed to the upper arm 27, and the socket 30c of the lower ball joint 30 is fixed to the lower arm 28. In other words, upper and lower sides of the left steering angle adjusting unit 24 are supported by the upper arm 27 and the lower arm 28 through the upper ball joint 29 and the lower ball joint 30.

With this configuration, the left steering angle adjusting unit 24 can turn around an axis of rotation O2 passing through the center C1 of the sphere 29b of the upper ball joint 29 and the center C2 of the sphere 30b of the lower ball joint 30. Therefore, a steering angle of the left tire 102 can be adjusted by turning the left steering angle adjusting unit 24. It should be noted that the axis of rotation O2 is referred to as a steering axis O2 in the following description.

As seen in FIG. 3, the lower arm 28 is bifurcated in a halfway and extends toward the fixing portion 26 so as to have a generally Y-shaped configuration when viewed from above. Further, the socket 30c of the lower ball joint 30 is fixed to the left end portion of the lower arm 28. Therefore, the distance L1 between the center C2 of the sphere 30b of the lower ball joint 30 and the fixing portion 26 is constant.

Further, a reinforcing portion 28a is provided on a lower support portion of the lower arm 28. The reinforcing portion 28a extends in an obliquely upward and rightward direction and is joined to the fixing portion 26.

The upper arm 27 includes an upper support strip 27a in the shape of a prism, an upper leg portion 27b having a generally Y-shaped configuration when viewed from above, and a connecting portion 27c. The upper support strip 27a extends in the right-left direction and is configured to support the socket 29c. The upper leg portion 27b extends from the lower side of the upper support strip 27a toward the fixing portion 26 and is bifurcated in a halfway. The connecting portion 27c is configured to connect the upper support strip 27a and the upper leg portion 27b.

As seen in FIG. 4, a hole 27d is formed in an upper surface of a left end portion of the upper leg portion 27b. A lower portion of the connecting portion 27c has a rod-like pin 27e to be inserted into the hole 27d. A right portion of the upper support strip 27a has a through opening 27f. The through opening 27f extends through the upper support strip 27a in the upper-lower direction to allow the connecting portion 27c to be inserted thereinto. The upper support strip 27a engages the connecting portion 27c inserted into the through opening 27f and is supported by the upper leg portion 27b so as not to become misaligned in the right-left direction and in the front-rear direction.

A total of three holes 27d are formed in the upper leg portion 27b. The holes 27 are aligned laterally in the right-left direction. For this reason, changing the position of the pin 27e to be inserted into the corresponding hole 27d makes it possible to change the distance L2 between the center C1 of the sphere 29b of the upper ball joint 29 and the fixing portion 26. Accordingly, it is possible to incline the steering axis O2 of the left tire 102 in the right-left direction by changing the distance L2, so that a camber angle of the tire 100 can be changed. In other words, the left tire holding unit 23 (tire holding unit 20) includes, as a camber angle changing unit capable of changing a camber angle, the lower arm 28 having a constant length, the extendable upper arm 27, and the upper ball joint 29 and the lower ball joint 30 for inclinably supporting the left steering angle adjusting unit 24.

As seen in FIG. 3, the fixing portion 26 includes a first plate portion 32 and a second plate portion 33. The first plate portion 32 has a plate shape extending in the front-rear direction and the upper-lower direction and is fixed to the main body 13 of the towed member 10 by welding. The second plate portion 33 extends in the front-rear direction and the upper-lower direction along the left surface of the first plate portion 32, and the upper arm 27 and the lower arm 28 are joined to the second plate portion 33.

As seen in FIG. 4, a central portion of the first plate portion 32 has a projection 32a formed to protrude leftward. A central portion of the second plate portion 33 has a through opening 33a formed in the position corresponding to the projection 32a and extending through the second plate portion 33 in the right-left direction. The projection 32a is inserted into the through opening 33a. The second plate portion 33 is fixed to the first plate portion 32 by two bolts 34 (see FIG. 3). The bolts 34 are inserted through the second plate portion 33 and screwed into corresponding female threaded holes 33b of the first plate portion 32, so that the second plate portion 33 is secured to the first plate portion 32.

The outer peripheral surface of the projection 32a and the inner peripheral surface of the through hole 33a are circular in shape. It is therefore possible to change an angle of attachment of the second plate portion 33 to the first plate portion 32 around the center line O3 of the projection 32a. Accordingly, it is possible to incline the steering axis O2 of the left tire 102 in the front-rear direction by changing the angle of attachment of the second plate portion 33 to the first plate portion 32. In other words, a caster angle can be changed.

It should be noted that the first plate portion 32 has a plurality of female threaded holes 33b arranged circumferentially around the center line O3. Therefore, even if the caster angle is changed, the second plate portion 33 can be fixed to the first plate portion 32 by screwing the bolts 34 into the female threaded holes 33b.

As seen in FIG. 4, the load measuring unit 2 is interposed between the hub 104 and the wheel 103. The load measuring unit 2 is a six-component force meter configured to measure a force (load) inputted to the left tire 102.

Although not shown in the drawings, an encoder (not shown) is disposed in the load measuring unit 2 to measure the number of rotations of the tire 100.

Further, an input portion (input portion for measuring a load) of the load measuring unit 2 is interposed between the hub 104 and the wheel 103, and is connected to the wheel 103.

It should be noted that according to the present invention, the load measuring unit 2 may be provided at any position other than the position between the hub 104 and the wheel 103 as long as it is disposed between the left tire holding unit 23 and the left tire 102. Therefore, the s load measuring unit 2 may be disposed between the axle 25 and the hub 104 or between the axle 25 and the bearing 24b. As an alternative, the load measuring unit 2 may be attached to the outer peripheral surface of the wheel 103 between the wheel 103 and the left tire 102.

Although not shown in the drawings, the steering angle meter (toe angle meter) is attached to the upper arm 27. The steering angle meter is configured to emit a laser beam toward the left steering angle adjusting unit 24 to measure a turning angle of the left steering angle adjusting unit 24, that is, the steering angle of the left tire 102.

The temperature sensor 4 is attached to an L-shaped fixture tool 4a fixed to the main body 13 of the towed member 10. The temperature sensor 4 is disposed over the left tire 102 and configured to measure a surface temperature of the tire 100.

Although not shown in the drawings, the pitch sensor is a device for measuring a rotation moment, i.e., pitch, acting around an axis passing through the towed member 10 in the right-left direction. The pitch sensor can determine whether values measured by the load measuring unit 2 are proper or not.

Although not shown in the drawings, the turning lateral acceleration meter is used to measure a load acting on a tire 100 located on an inner peripheral side and a load acting on a tire 100 located on an outer peripheral side during cornering of the towed member 10 because the load acting on the inner tire 100 and the load acting on the outer tire 100 are different from each other.

It should be noted that the load measuring unit 2, the steering angle meter (toe angle meter), and the temperature sensor 4 are provided not only on the side of the left tire holding unit 23 but also on the side of the right tire holding unit 21. Therefore, it is possible to measure a load acting on the right tire 101, the steering angle (toe angle) of the right tire 101, and the temperature of the right tire 101.

As seen in FIG. 2, the actuator 40 is a servo motor configured to change the steering angle of the right tire 101 and the steering angle of the left tire 102.

When viewed from above, the output shaft 41 of the actuator 40 coincides with the center line M1, so that the actuator 40 is disposed on the center line M1 passing through the lateral center of the towed member 10.

Further, according to this embodiment, the actuator 40 is disposed on the lower side of the towed member 10. This makes it possible to improve the degree of freedom of the layout of the movable member or the towed member 10 on which the actuator 40 is mounted. It should be noted that according to the present invention, the actuator 40 may be provided at any position other than the position on the lower side of the movable member or the towed member 10.

The transmission unit 50 includes a power converting unit 51 disposed and fixed between the pair of long plate members 14, 15 and connected to the output shaft 41, a right link portion 52 connected to the right steering angle adjusting unit 22, and a left link portion 53 connected to the left steering angle adjusting unit 24.

The power converting unit 51 includes a housing 51a disposed between the pair of long plate members 14, 15, and a first slide shaft 51b and a second slide shaft 51c penetrating through the front long plate member 14.

The first slide shaft 51b is disposed rightward of the center line M1 and is connected to a left end portion of the right link portion 52. The second slide shaft 51c is disposed leftward of the center line M1 and is connected to a right end portion of the left link portion 53.

The first slide shaft 51b is slidable in the right-left directions (see arrows A1, A2 of FIG. 2). Similarly, the second slide shaft 51c is slidable in the right-left directions (see arrows B1, B2 of FIG. 2).

Although not shown in the drawings, provided in the housing 51a are a trapezoidal threaded screw connected to the output shaft 41 and configured to convert a rotary motion to a back-and-forth motion, a first link mechanism configured to convert the back-and-forth motion of the trapezoidal threaded screw to a to-and-fro lateral motion of the first slide shaft 51b, and a second link mechanism configured to convert the back-and-forth motion of the trapezoidal threaded screw to a to-and-fro lateral motion of the second slide shaft 51c.

The right link portion 52 and the left link portion 53 are rod-like components extending in the right-left direction.

A left end portion of the left link portion 53 is connected to the front protruding portion 24d of the left steering angle adjusting unit 24 through the front ball joint 31 (see FIG. 3).

A right end portion of the right link portion 52 is connected to the front protruding portion of the right steering angle adjusting unit 22 through the front ball joint 31.

With this configuration, when the actuator 40 is driven to cause the first slide shaft 51b and the second slide shaft 51c to move in the right-left direction, the right steering angle adjusting unit 22 and the left steering angle adjusting unit 24 turn around their steering axes O2, so that the steering angle of the right tire 101 and the steering angle of the left tire 102 can be changed accordingly.

The first link mechanism and the second link mechanism of the power converting unit 51 are configured to convert such that the first slide shaft 51b and the second slide shaft 51c are caused to slide in laterally opposite directions to each other. Accordingly, the right link portion 52 and the left link portion 53 move in the laterally opposite directions to each other when the actuator 40 is driven.

Figure 5:
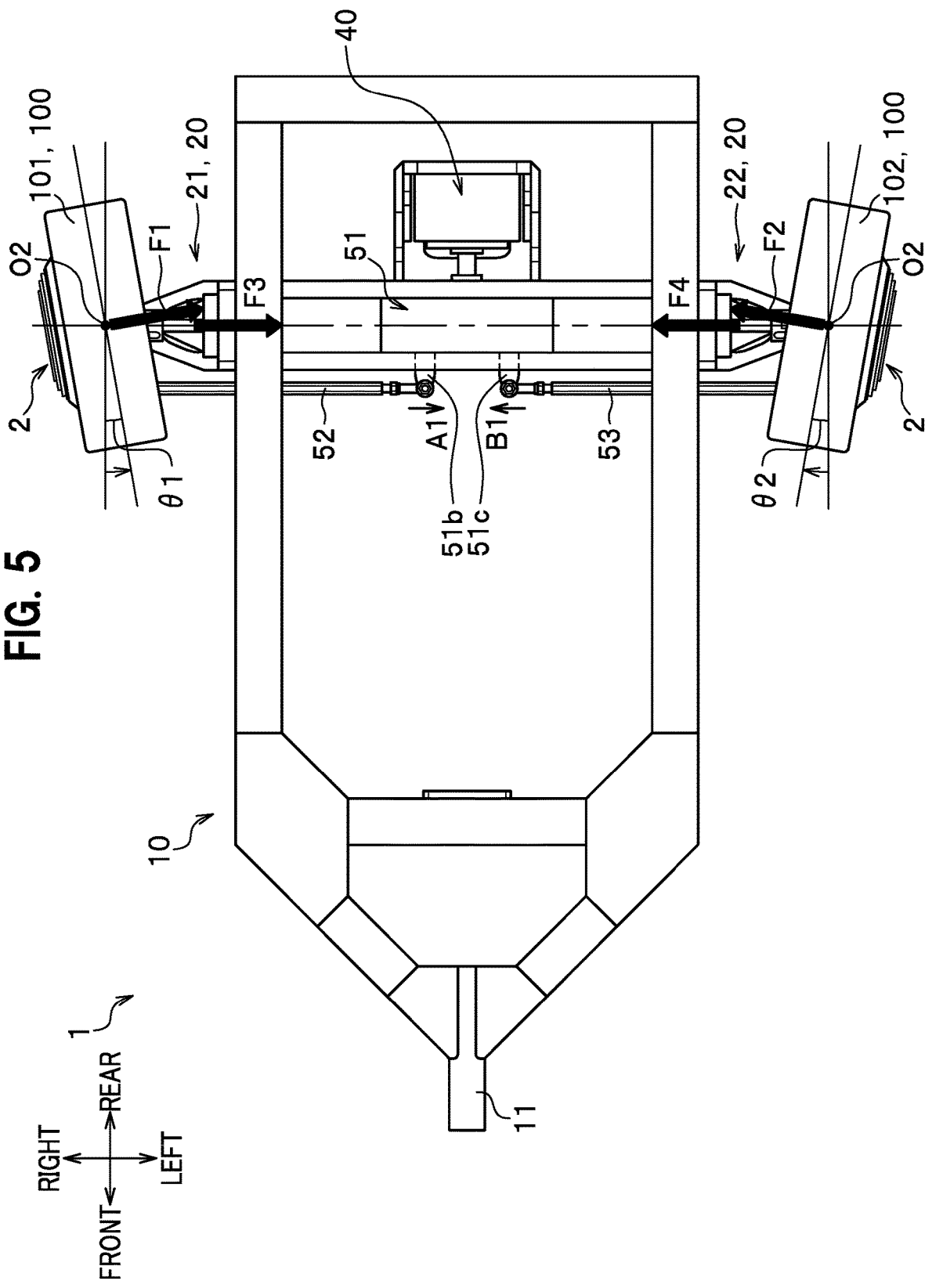
FIG. 5 is a top view of the tire tester according to the first embodiment showing a state in which an actuator is driven.

When the output shaft 41 of the actuator 40 rotates in one direction, the first slide shaft 51b moves to the left (in the direction shown by arrow A1 of FIG. 2) and the second slide shaft 51c moves to the right (in the direction shown by arrow B1 of FIG. 2). As a result, as shown in FIG. 5, the right tire 101 and the left tire 102 are steered inward with each other, resulting in a toe-in state.

On the other hand, when the output shaft 41 of the actuator 40 rotates in the other direction, the first slide shaft 51b moves to the right (in the direction shown by arrow A2 of FIG. 2) and the second slide shaft 51c moves to the left (in the direction shown by arrow B2 of FIG. 2). As a result, although not shown in the drawings, the right tire 101 and the left tire 102 are steered outward with each other, resulting in a toe-out state.

As described above, the toe angle of the right tire 101 and the toe angle of the left tire 102 are changed by the movement of the right link portion 52 and the left link portion 53.

According to the first embodiment, the right steering angle adjusting unit 22 corresponds to a right toe angle adjusting unit capable of adjusting a toe angle of the right tire 101, the left steering angle adjusting unit 24 corresponds to a left toe angle adjusting unit capable of adjusting a toe angle of the left tire 102, and the steering angle meter corresponds to a toe angle meter capable of measuring a toe angle of the tire 100.

As described above, according to the tire tester 1 of the first embodiment, when the movable member moves, the towed member 10 is towed by the movable member, so that the right tire 101 and the left tire 102 rotate. Further, when the actuator 40 is driven, the right tire 101 and the left tire 102 are steered and a load such as a lateral force (see arrows F1, F2 of FIG. 5) acts on the right tire 101 and on the left tire 102. The lateral force F1 acting on the right tire 101 is measured by the load measuring unit 2 retained by the right tire holding unit 21. The lateral force F2 acting on the left tire 102 is measured by the load measuring unit 2 retained by the left tire holding unit 23. With this configuration, the tire tester 1 according to this embodiment can determine tire characteristics of the right tire 101 and the left tire 102.

Lateral forces F1, F2 are transmitted to the towed member 10 to which the right tire holding unit 21 and the left tire holding unit 23 are attached, and the lateral forces F1, F2 contain lateral component forces (forces acting in the lateral direction (right-left direction)) F3, F4. In other words, the lateral component forces F3, F4 act on the towed member 10.

It should be noted that the right tire 101 and the left tire 102 are a toe-in state or a toe-out state while measuring the lateral forces, and the lateral force F1 acting on the right tire 101 and the lateral force F2 acting on the left tire 102 are directed in laterally opposite directions to each other in the right-left direction. Accordingly, the lateral component forces F3, F4 transmitted to the towed member 10 are also directed in laterally opposite directions to each other in the right-left direction.

Further, as described above, since the right tire holding unit 21 and the left tire holding unit 23 are arranged symmetrically with respect to the center line M1 of the towed member 10, the lateral component forces F3, F4 transmitted to the towed member 10 through the right tire holding unit 21 and the left tire holding unit 23 are present on the same line of action. Therefore, it is possible to cancel out the lateral component forces F3, F4 acting on the towed member 10, thereby preventing the tire tester 1 from traveling meanderingly.

Further, since the right and left linkages (right link portion 52 and left link portion 53) are driven by one actuator 40 to steer the right tire 101 and the left tire 102, the right tire 101 and the left tire 102 can be steered simultaneously with the same steering angle. Accordingly, the towed member 10 is far less likely to travel meanderingly, and the measurement accuracy of the load measuring unit 2 is markedly improved.

Further, according to this embodiment, the left steering angle adjusting unit 24 is inclined inwardly or outwardly in the vehicle width direction by extending or contracting the upper arm 27 (by changing the position of the hole 27d into which the pin 27e is inserted), so that a positive camber (in the case where L1>L2) or a negative camber (in the case where L2>L1) can be set.

The left steering angle adjusting unit 24 is connected to the left link portion 53 through the front ball joint 31, and the left steering angle adjusting unit 24 can be inclined with respect to the left link portion 53. Accordingly, the left link portion 53 does not prevent the left steering angle adjusting unit 24 from being inclined.

Further, even if the camber angle has been changed, the front protruding portion 24d of the left steering angle adjusting unit 24 is pressed in the vehicle width direction when the left link portion 53 slides, so that the left steering angle adjusting unit 24 is caused to turn. Accordingly, the left tire 102 can be steered even after changing the camber angle.

Further, providing the steering angle meter (toe angle meter) makes it possible to accurately measure the steering angle (toe angle) of the tire 100 (right tire 101 and left tire 102) even after changing the camber angle.

As described above, the first embodiment has been explained with reference to an example in which one actuator 40 is provided to change a steering angle of a plurality of tires 100, and a toe angle of the plurality of tires 100 can be changed by the one actuator. Next, an explanation is given of a tire tester including a plurality of actuators for changing steering angles of a plurality of tires 100, wherein toe angles of the tires can be changed by the plurality of actuators.

Second Embodiment

Figure 6:
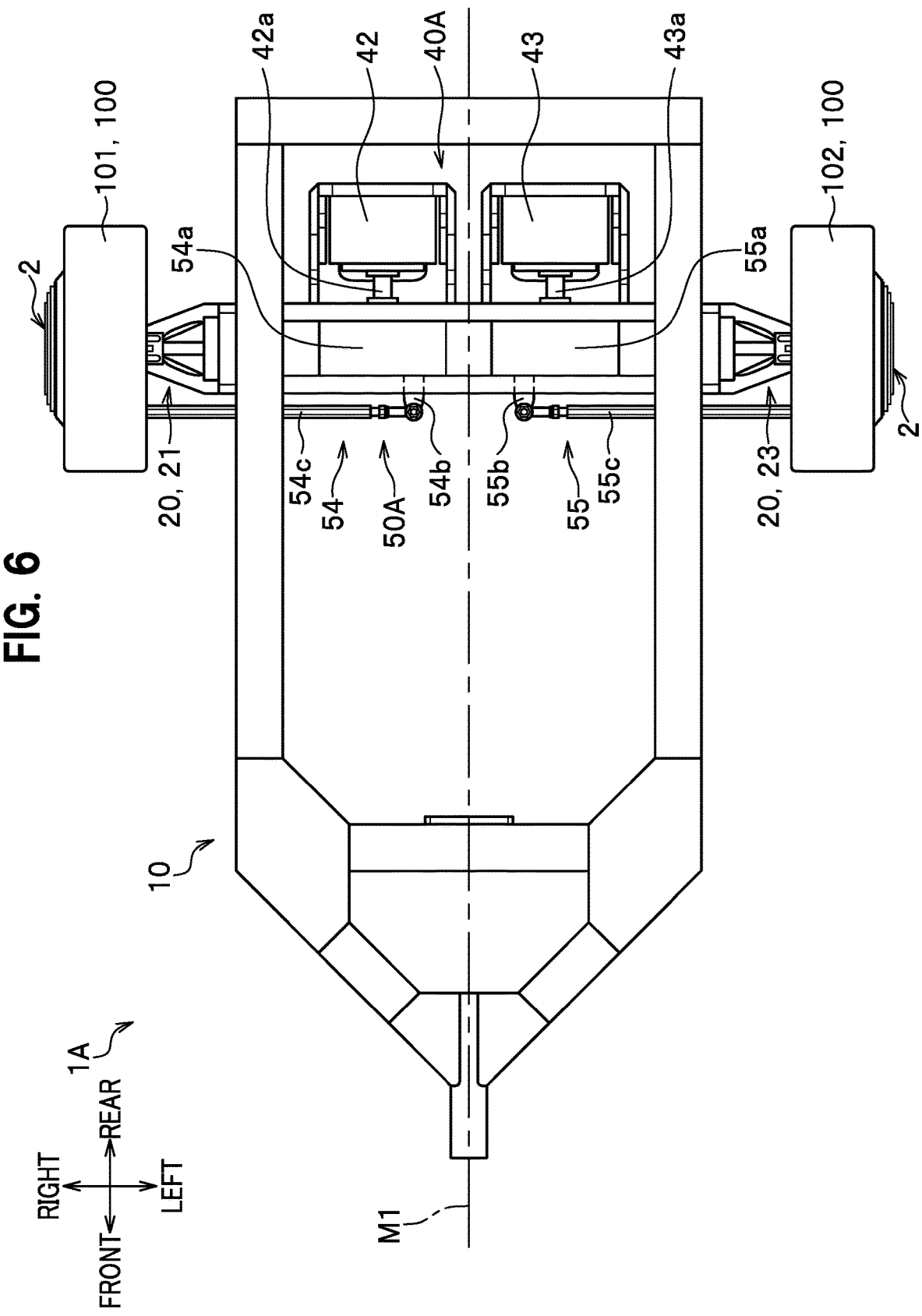
FIG. 6 is a top view of a tire tester according to a second embodiment when viewed from above.

As seen in FIG. 6, a tire tester 1A according to a second embodiment is attached to a towed member 10 towed by a movable member, and includes a plurality of tire holding units 20 (right tire holding unit 21 and left tire holding unit 23) configured to detachably hold tires 100, a plurality of actuators 40A attached to the towed member 10, and a plurality of transmission units 50A each configured to transmit the driving force of the actuator 40A to the tire holding unit 20.

Further, the tire tester 1A according to the second embodiment includes load measuring units 2 each interposed between a tire holding unit 20 (right tire holding unit 21 and left tire holding unit 23) and a tire 100 (right tire 101 and left tire 102).

Further, although not shown in the drawings, the tire tester 1A according to the second embodiment includes a steering angle meter (toe angle meter), a temperature sensor, a pitch sensor, and a turning lateral acceleration meter.

Therefore, the tire tester 1A according to the second embodiment is different from the tire tester 1 according to the first embodiment in that it includes a plurality of actuators 40A in place of one actuator 40, and a plurality of transmission units 50A in place of one transmission unit 50.

The tire tester 1A according to the second embodiment is described, focusing on these differences.

The number of actuators 40A and the number of transmission units 50A are the same as s the number of tires 100 (right tire 101 and left tire 102), and two actuators 40A and two transmission units 50A are provided corresponding to the two tires 100.

To be described further in detail, the plurality of actuators 40A include a right actuator 42 disposed on the right side of the towed member 10 with respect to the center line M1, and a left actuator 43 disposed on the left side of the towed member 10 with respect to the center line M1.

The transmission units 50A include a right transmission unit 54 disposed on the right side of the towed member 10 with respect to the center line M1, and a left transmission unit 55 disposed on the left side of the towed member 10 with respect to the center line M1.

The right transmission unit 54 includes a right power converting unit 54a connected to the output shaft 42a of the right actuator 42, and a right link portion 54c connected to the output shaft (right slide shaft 54b) of the right power converting unit 54a and the right steering angle adjusting unit of the right tire holding unit 21.

Although not shown in the drawings, the right power converting unit 54a includes a trapezoidal threaded screw connected to the output shaft 42a and configured to convert a rotary motion to a back-and-forth motion, and a link mechanism configured to convert the back-and-forth motion of the trapezoidal threaded screw to a to-and-fro lateral motion of the output shaft (right slide shaft 54b).

With this configuration, when the right actuator 42 is driven to cause the right slide shaft 54b and the right link portion 54c to slide, the steering angle of the right tire 101 held by the right tire holding unit 21 can be adjusted.

The left transmission unit 55 includes a left power converting unit 55a connected to the output shaft 43a of the left actuator 43, and a left link portion 55c connected to the output shaft (left slide shaft 55b) of the left power converting unit 55a and the left steering angle adjusting unit of the left tire holding unit 23.

Although not shown in the drawings, the left power converting unit 55a includes a trapezoidal threaded screw connected to the output shaft 43a and configured to convert a rotary motion to a back-and-forth motion, and a link mechanism configured to convert the back-and-forth motion of the trapezoidal threaded screw to a to-and-fro lateral motion of the output shaft (left slide shaft 55b).

With this configuration, when the left actuator 43 is driven to cause the left slide shaft 55b and the left link portion 55c to slide, the steering angle of the left tire 102 held by the left s tire holding unit 23 can be adjusted.

As described above, the tire tester 1A according to the second embodiment can adjust the steering angle of the right tire 101 and the steering angle of the left tire 102 separately and independently. Therefore, only the right tire 101 can be steered inward without steering the left tire 102 during the tire test. In other words, it is possible to apply a lateral force F5 (see FIG. 7) only to the right tire 101.

Figure 7:
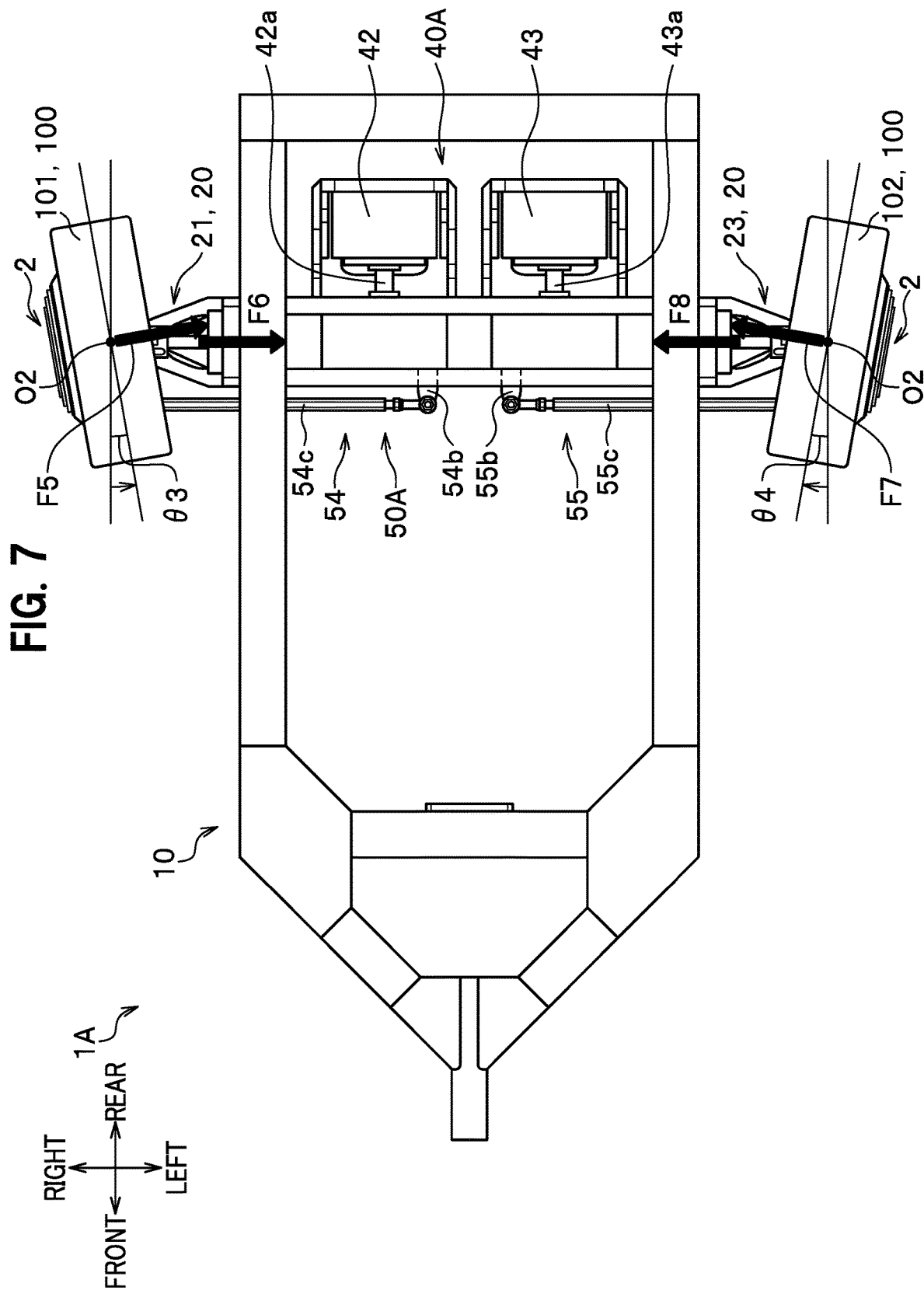
FIG. 7 is a top view of the tire tester according to the second embodiment showing a state in which two actuators are driven.

Further, when a lateral component force F6 (see FIG. 7) is transmitted to the towed member 10 due to generation of a lateral force F5 and the tire tester 1A is likely to travel meanderingly, the left tire 102 is steered inward to set a toe-in state as shown in FIG. 7 and thus to cause a lateral force F7 to act on the left tire 102. It should be noted that the steering angle θ3 of the right tire 101 and the steering angle θ4 of the left tire 102 are set to be the same angle.

With this configuration, the leftward force F6 and the rightward force F8 are transmitted to the towed member 10, so that these sideward forces (lateral component forces) are canceled out, thereby preventing the towed member 10 from traveling meanderingly.

An error may arise when the right tire holding unit 21 or the left tire holding unit 23 is mounted to the towed member 10.

Such an error may cause a state in which although the steering angle of the right tire 101 and the steering angle of the left tire 102 are properly set to 0 degree in the initial state where the right actuator 42 and the left actuator 43 are not in operation, only the left tire 102 is steered to some extent.

To address this problem, the tire tester 1A according to this embodiment can operate such that only the left actuator 43, among the right actuator 42 and the left actuator 43, is independently driven to adjust the steering angle of the left tire 102 that is measured by the steering angle meter to 0 degree. In other words, even if an error arises in mounting the right tire holding unit 21 or the left tire holding unit 23 to the towed member 10, the error can be corrected.

Further, the tire tester 1A according to the second embodiment can be operated, for example, such that the right tire 101 and the left tire 102 are steered leftward while the tire tester 1A is being carried so as to change the traveling direction of the tire tester 1A to the left side. Accordingly, the tire tester 1A can be moved easily.

In the first embodiment and the second embodiment, a tire tester mounted on the towed member 10 has been described. Next, an explanation is given of a tire tester mounted on a four-wheel vehicle.

Third Embodiment

Figure 8:
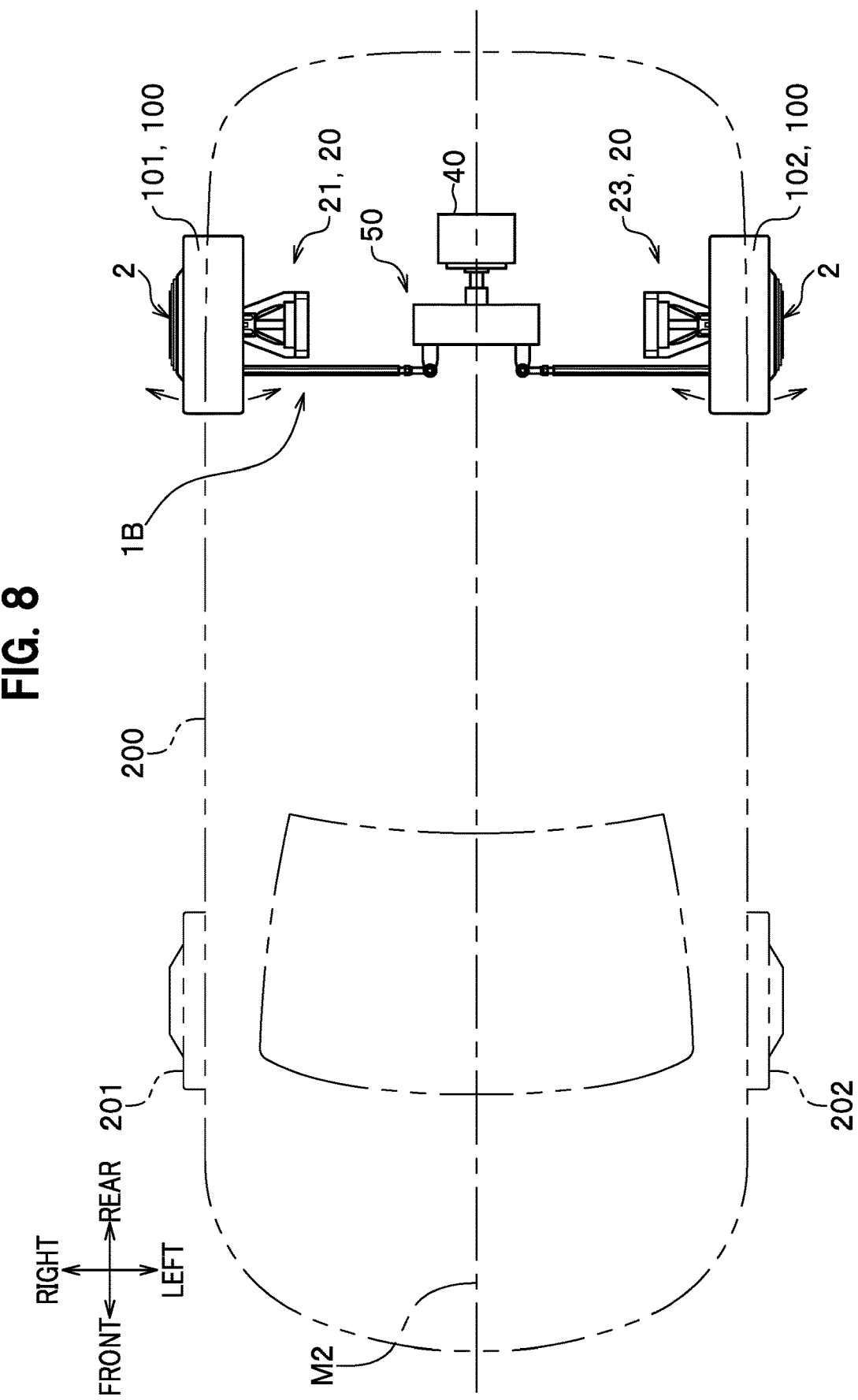
FIG. 8 is a top view of a four-wheel vehicle on which a tire tester according to a third embodiment is mounted.

As seen in FIG. 8, a tire tester 1B according to a third embodiment includes a plurality of tire holding units 20 attached to a four-wheel vehicle 200 as a self-propelled movable member, an actuator 40, and a transmission unit 50 for transmitting the driving force of the actuator 40 to the tire holding units 20.

The plurality of tire holding units 20 include a right tire holding unit 21 attached to the right side of the four-wheel vehicle (movable member) 200 with respect to a center line M2 of the four-wheel vehicle 200 and configured to hold the right tire 101, and a left tire holding unit 23 attached to the left side of the four-wheel vehicle (movable member) 200 with respect to the center line M2 and configured to hold the left tire 102.

The right tire holding unit 21 and the left tire holding unit 23 are arranged symmetrically with respect to the center line M2 of the four-wheel vehicle (movable member) 200.

The actuator 40 is disposed on the center line M2 passing through the lateral center of the four-wheel vehicle (movable member) 200.

Further, the tire tester 1B according to the second embodiment includes load measuring units 2 interposed between the tire holding units 20 (right tire holding unit 21 and left tire holding unit 23) and the tires 100 (right tire 101 and left tire 102).

Further, although not shown in the drawings, the tire tester 1B according to the third embodiment includes a steering angle meter (toe angle meter), a temperature sensor, a pitch sensor, and a turning lateral acceleration meter.

Components of the tire tester 1B according to the third embodiment are the same as those of the tire tester 1 according to the first embodiment, though they are mounted on a different object.

The tire tester 1B according to the third embodiment is mounted on a rear side of the four-wheel vehicle 200. The right tire holding unit 21, the left tire holding unit 23, the actuator 40, and the transmission unit 50 are fixed to a body of the four-wheel vehicle 200.

The four-wheel vehicle 200 is a front-wheel-drive vehicle propelled by driving the front wheels 201, 202. The right tire 101 held by the right tire holding unit 21 constitutes the rear right wheel of the four-wheel vehicle 200, and the left tire 102 held by the left tire holding unit 23 constitutes the rear left wheel of the four-wheel vehicle 200.

When the four-wheel vehicle 200 travels by driving the front wheels 201, 202, the right tire 101 and the left tire 102 rotate.

As described above, the tire tester 1B according to the third embodiment is configured such that when the actuator 40 is driven while the four-wheel vehicle 200 is traveling, the right tire 101 and the left tire 102 are steered (see arrows of FIG. 8) and a load such as a lateral force acts on each of the right tire 101 and the left 102.

Further, since the right tire 101 and the left tire 102 are a toe-in state or a toe-out state, the lateral force acting on the right tire 101 and the lateral force acting on the left tire 102 are directed in opposite directions to each other. This makes it possible to cancel out the lateral component forces acting on the four-wheel vehicle 200 to thereby prevent the four-wheel vehicle 200 from traveling meanderingly.

According to the third embodiment, the tire tester 1B employing one actuator 40 for steering two tires 100 (right tire 101 and left tire 102) is mounted on the four-wheel vehicle 200. However, as with the second embodiment, a tire tester including a plurality of actuators corresponding to the number of tires to be steered may be mounted on the four-wheel vehicle as a modified embodiment. An explanation is given of this modified embodiment.

Figure 9:
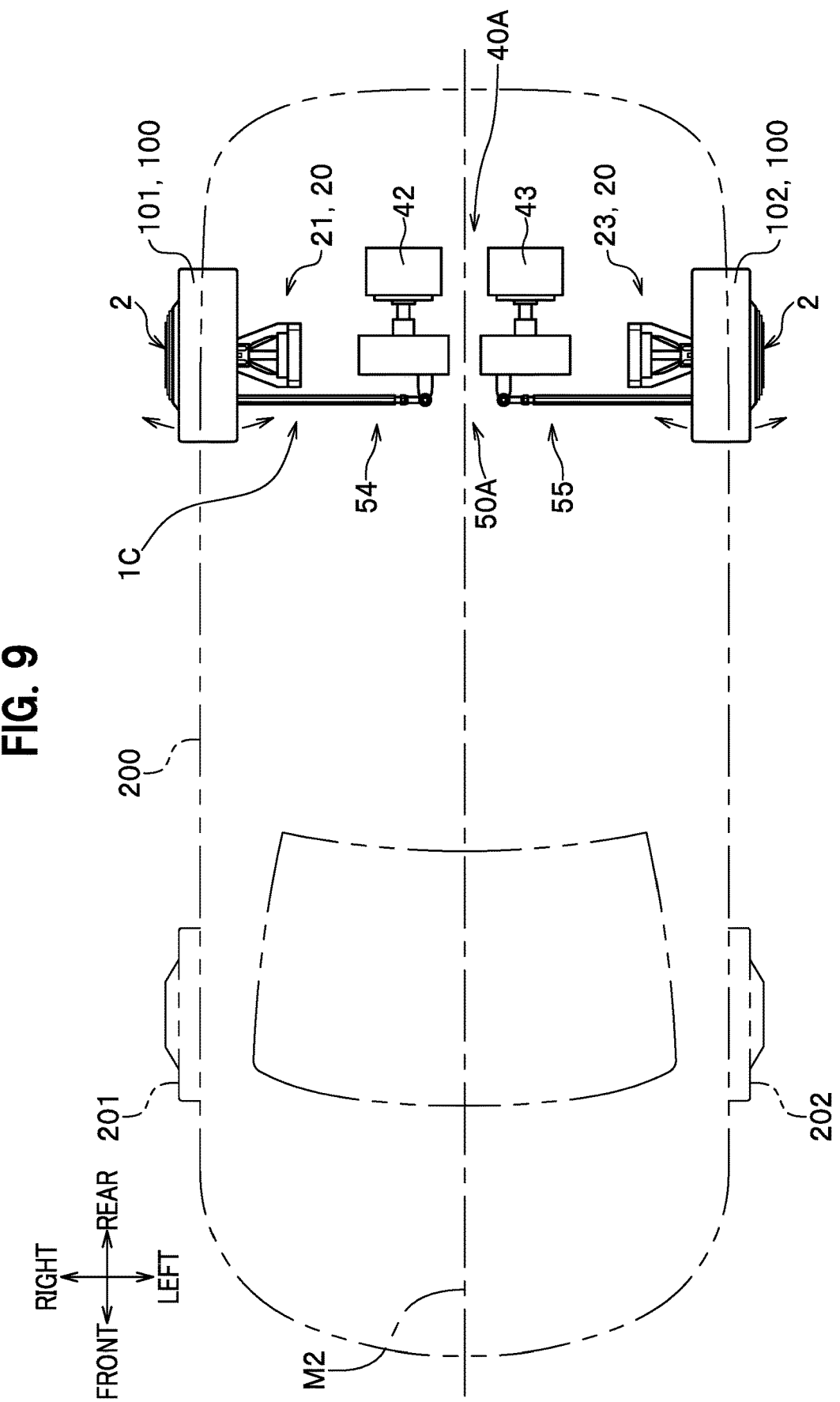
FIG. 9 is a top view of a four-wheel vehicle on which a tire tester according to a modification of the third embodiment is mounted.

As seen in FIG. 9, a tire tester 1C according to a modified embodiment includes a plurality of tire holding units 20 (right tire holding unit 21 and left tire holding unit 23) attached to a four-wheel vehicle as a self-propelled movable member, a plurality of actuators 40A (right actuator 42 and left actuator 43), and a plurality of transmission units 50A (right transmission unit 54 and left transmission unit 55) each configured to transmit the driving force of the actuator 40A to the tire holding unit 20.

The plurality of tire holding units 20 (right tire holding unit 21 and left tire holding unit 23) are arranged symmetrically with respect to the center line M2 of the four-wheel vehicle (movable member) 200.

The tire tester 1C according to the modified embodiment includes load measuring units 2 interposed between the tire holding units 20 (right tire holding unit 21 and left tire holding unit 23) and the tires 100 (right tire 101 and left tire 102).

Further, although not shown in the drawings, the tire tester 1C includes a steering angle meter (toe angle meter), a temperature sensor, a pitch sensor, and a turning lateral acceleration meter.

The tire tester 1C is mounted on a rear side of the front-wheel-drive type four-wheel vehicle 200 propelled by driving the front wheels 201, 202. The right tire 101 held by the right tire holding unit 21 constitutes the rear right wheel of the four-wheel vehicle 200, and the left tire 102 held by the left tire holding unit 23 constitutes the rear left wheel of the four-wheel vehicle 200. When the four-wheel vehicle 200 travels by driving the front wheels 201, 202, the right tire 101 and the left tire 102 rotate.

The tire tester 1C according to the modified embodiment is configured such that when one of the right actuator 42 and the left actuator 43 is driven while the four-wheel vehicle 200 is traveling, one of the right tire 101 and the left tire 102 is steered and a load such as a lateral force acts on one of the right tire 101 and the left 102.

Further, when the four-wheel vehicle 200 is likely to travel meanderingly due to generation of the lateral force, the other one of the right actuator 42 and the left actuator 43 is driven to set the right tire 101 and the left tire 102 to be a toe-in state or a toe-out state. Accordingly, the lateral component forces acting on the four-wheel vehicle 200 are canceled out, thereby preventing the four-wheel vehicle 200 from traveling meanderingly.

The first to third embodiments have been described above.

In the first to third embodiments, the load measuring units 2 are disposed one on each of the right tire holding unit 21 and the left tire holding unit 23 to measure a load acting on the right tire 101 and a load acting on the left tire 102. However, according to the present invention, one load measuring unit 2 may be disposed only on the tire holding unit that holds the subjected tire required for measuring tire characteristics. Namely, the load measuring unit 2 according to the present invention may be interposed at least between the right tire holding unit 21 and right tire 101 or between the left tire holding unit 23 and the left tire 102. Therefore, according to the present invention, one or more load measuring units 2 may be provided.

Similarly, the steering angle meter (toe angle meter) may be disposed at least at the right tire holding unit 21 or at the left tire holding unit 23.

Further, the temperature sensor 4 may be disposed at least on the right side or on the left side of the movable member (four-wheel vehicle 200) or the towed member 10.

Further, if the tire tester 1 according to the first embodiment and the tire tester 1A according to the second embodiment include a small-weighted towed member 10 with a small force to press the tires 100 to the road surface, the towed member 10 may be provided with a loading space for carrying weights, so that a load acting on the tires 100 can be adjusted.

Figure 10:
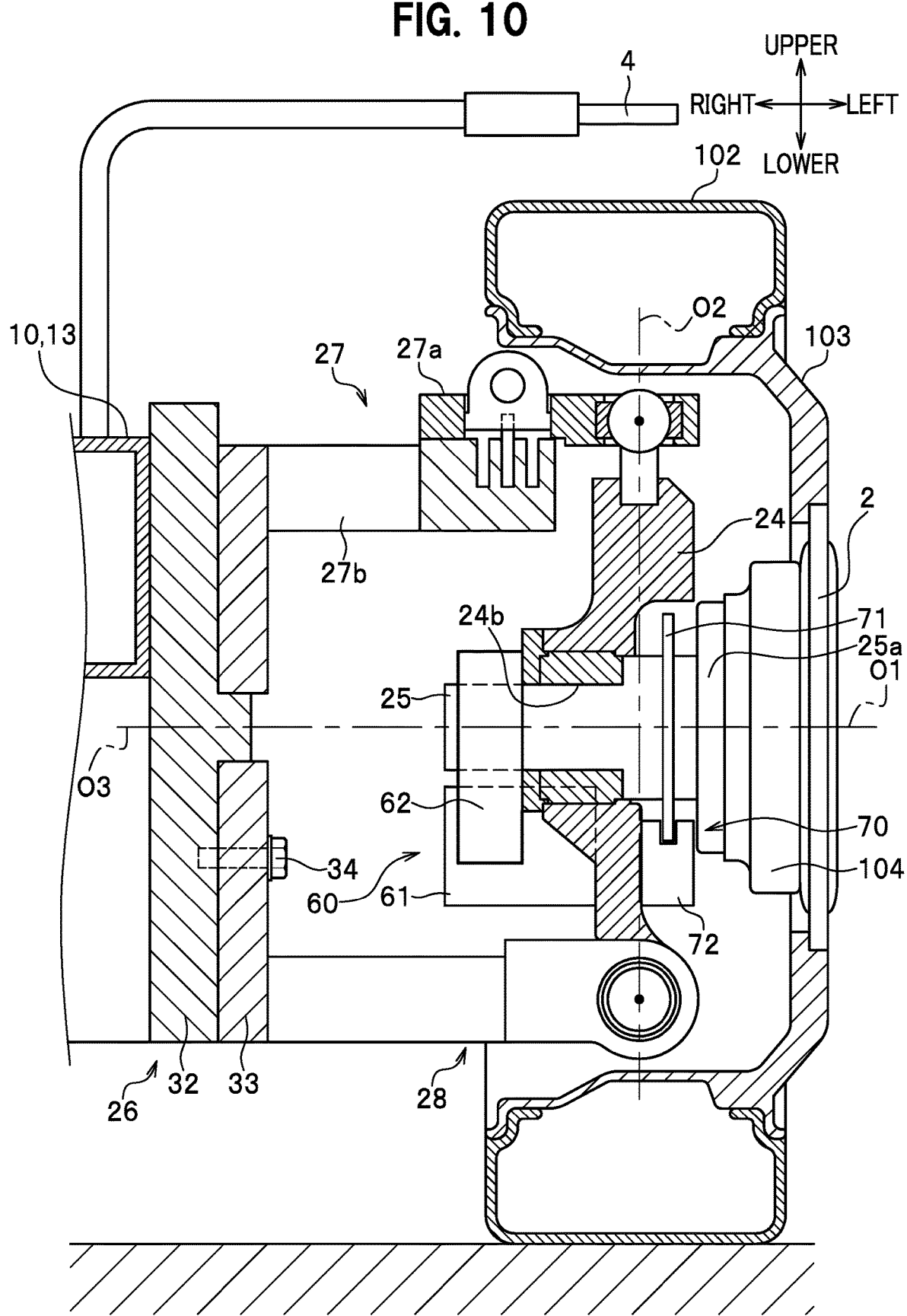
FIG. 10 is a sectional view of a left tire holding unit equipped with a drive mechanism and a braking mechanism.

Further, as seen in FIG. 10, the tire holding unit 20 may include a drive mechanism 60 for driving the tire 100, and a braking mechanism 70 for applying a braking force to the tire 100.

To be more specific, the drive mechanism 60 includes an electric motor (not shown) accommodated in a housing 61 fixed to the left tire holding unit 23 (tire holding unit 20), and a speed reduction unit 62 configured to transmit the driving force of the electric motor to the axle 25 while reducing the rotational speed of the electric motor.

Further, the braking mechanism 70 includes a brake disc 71 protruding outward from the outer peripheral surface of the axle 25, and a brake caliper 72 fixed to the left tire holding unit 23 (tire holding unit 20).

According to the above-described configuration, since the output shaft of the electric motor and the axle 25 rotate synchronously, the electric motor may be used as a regenerative brake.

Further, the tire tester according to the present invention may be configured such that the tire holding unit does not include a steering angle adjusting unit and the steering angle of the tire is unchanged. Accordingly, the tire tester may not be equipped with an actuator for turning the steering angle adjusting unit and a transmission unit.

In other words, the tire tester according to the present invention may only include a plurality of tire holding units 20 attached to a self-propelled four-wheel vehicle (movable member) 200 or to a towed member 10 towed by the four-wheel vehicle 200 and each configured to detachably hold the tire to rotate when the four-wheel vehicle (movable member) 200 travels, and a load measuring unit 2 interposed between at least one tire holding unit 20 among the plurality of tire holding units 20 and the corresponding tire 100 and configured to measure a load acting to the tire 100.

Even with this configuration, if the tire holding units 20 are attached to the towed member 10 or to the four-wheel vehicle 200 to keep a toe-in state or a toe-out state in advance, it is possible to cancel out the lateral component forces generated in the towed member 10 or the four-wheel vehicle 200.

Next, an explanation is given of an example in which a tire tester according to the present invention is adapted to an installation-type tire tester.

Fourth Embodiment

First, a tire rotating device 300 is described below.

Figure 11:
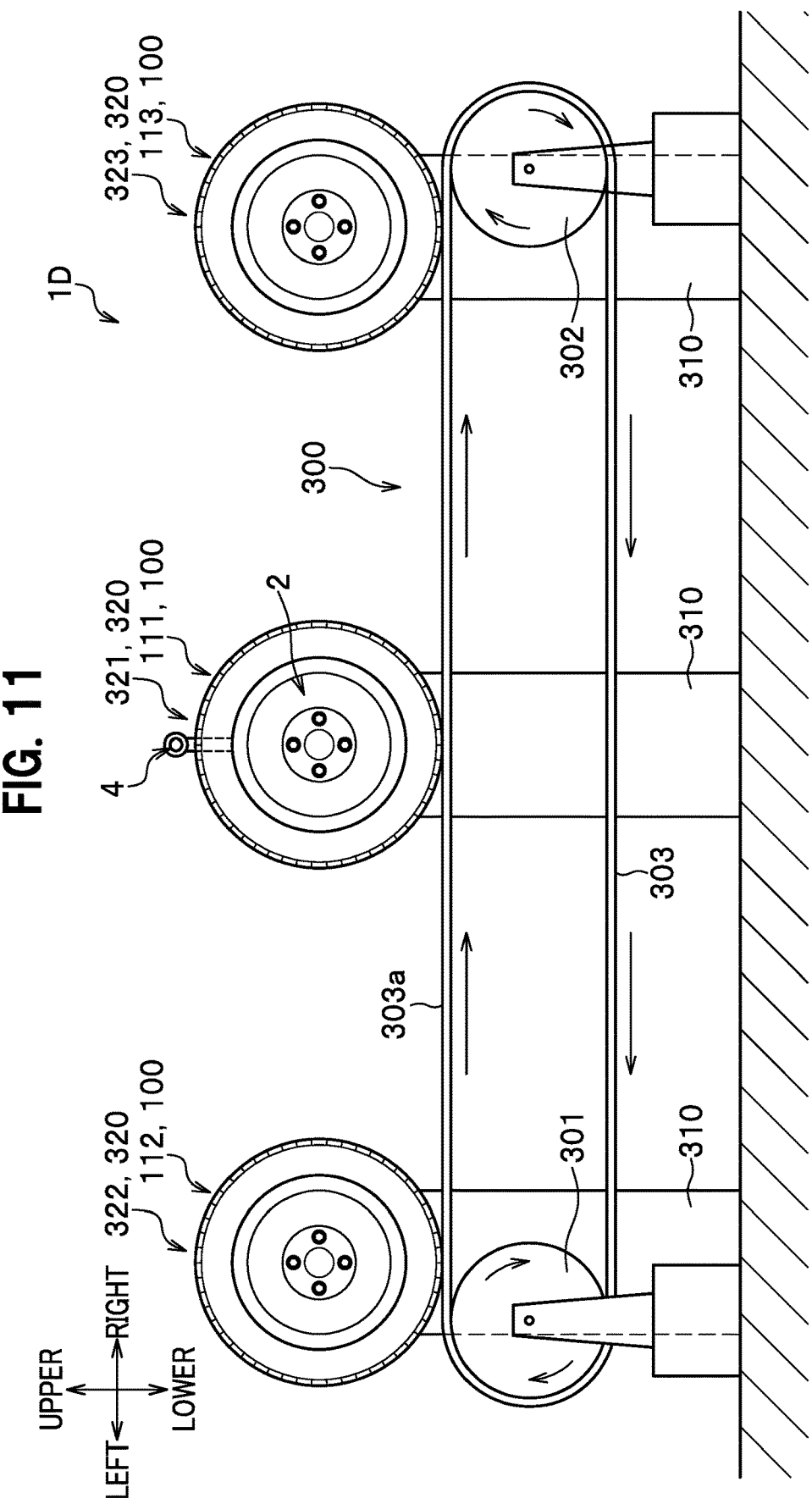
FIG. 11 is a rear view of a tire tester according to a fourth embodiment when viewed from the rear side.

As seen in FIG. 11, the tire rotating device 300 includes a left drum 301 and a right drum 302 disposed spaced apart from each other, an endless belt 303 made of steel and looped around the left drum 301 and the right drum 302, and motors (not shown) for rotating the left drum 301 and the right drum 302. When the left drum 301 and the right drum 302 are caused to rotate by driving the motors (not shown) and the belt 303 rotates, a tire 100 in contact with the upper surface of the belt 303 then rotates.

Figure 12:
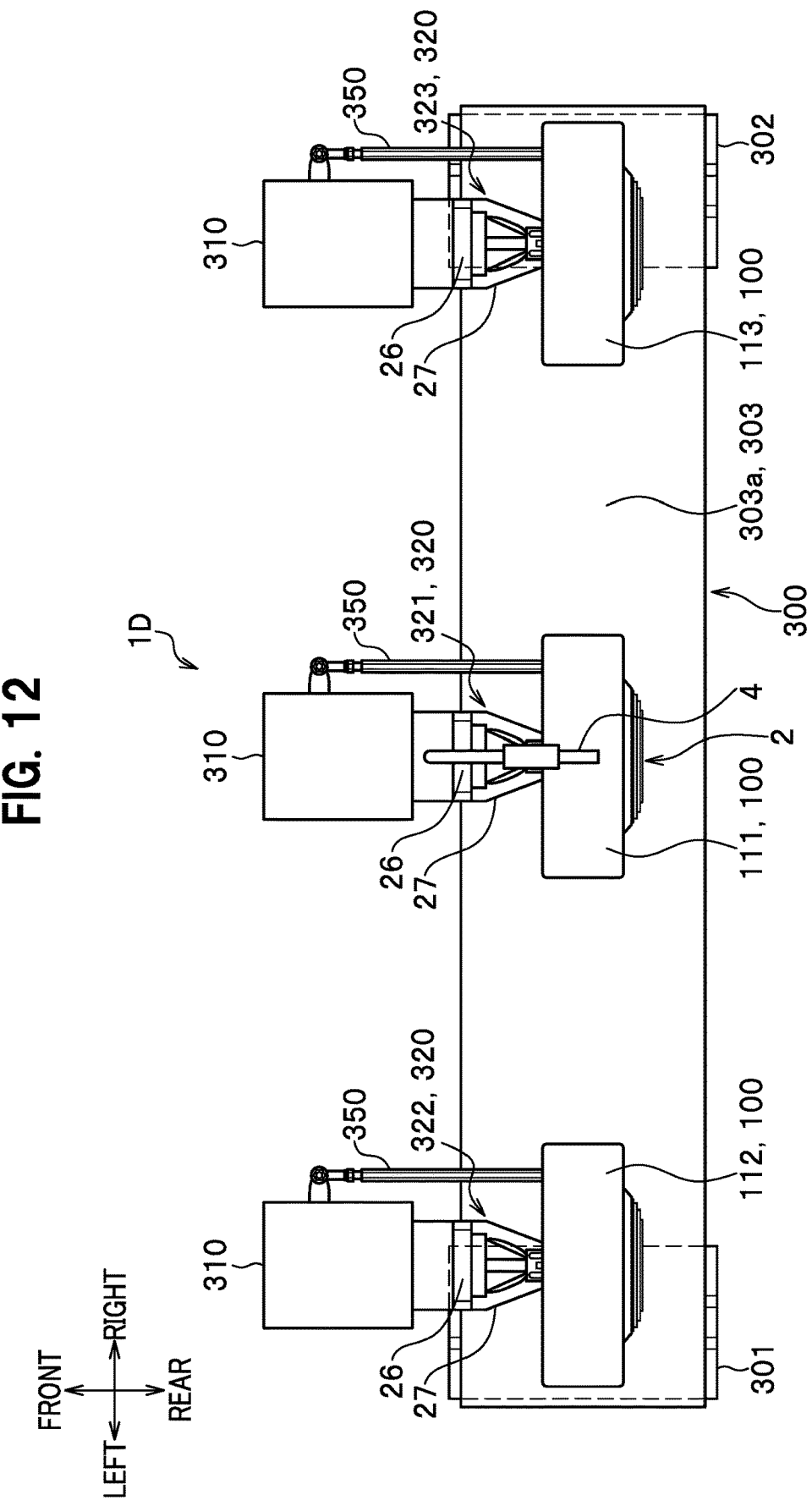
FIG. 12 is a top view of the tire tester according to the fourth embodiment when viewed from above.

As seen in FIG. 12, a tire tester 1D according to a fourth embodiment includes a plurality of tire holding units 320 (first to third tire holding units 321-323) configured to detachably hold tires 100 (first to third tires 111-113) to rotate on the belt 303 of the tire rotating device 300, and a load measuring unit 2 interposed between the tire 100 (first tire 111) and at least one tire holding unit 320 (first tire holding unit 321) among the plurality of tire holding units 320 and configured to measure a force acting on the tire 100 (first tire 111).

The plurality of tire holding units 320 include a first tire holding unit 321 for holding a first tire 111, a second tire holding unit 322 for holding a second tire 112, and a third tire holding unit 323 for holding a third tire 113.

The first tire holding unit 321, the second tire holding unit 322, and the third tire holding unit 323 have the same structure as the right tire holding unit 21 and the left tire holding unit 23 described in the first embodiment, and each include a fixing portion 26 fixed on a stage 310 that is provided in the proximity of (at the front side of) the tire rotating device 300, an upper arm 27 and a lower arm (not shown) extending from the fixing portion 26 toward the belt, and a steering angle adjusting unit (not shown) turnably supported by the upper arm 27 and the lower arm.

The first tire holding unit 321 is located in a laterally central portion in the right-left direction, and the first tire 111 is in contact with a laterally central portion of the upper surface 303a of the belt 303.

The second tire holding unit 322 is located rightward of and spaced apart from the first tire holding unit 321, and the second tire 112 is in contact with the right side of the upper surface 303a of the belt 303.

The third tire holding unit 323 is located leftward of and spaced apart from the first tire holding unit 321, and the third tire 113 is in contact with the left side of the upper surface 303a of the belt 303.

Accordingly, the tires 100 held by the plurality of tire holding units 320 are in contact with the outer peripheral surface of the belt 3 and rotate when the belt 303 is driven.

According to this embodiment, the load measuring unit 2 is provided only at the first tire holding unit 321 and can measure a load acting on the first tire 111. The tire tester 1D further includes a steering angle meter (not shown) for measuring a steering angle of the first tire, and a temperature sensor 4 for measuring a surface temperature of the first tire 111.

Further, the tire tester 1D includes a plurality of actuators (not shown) for changing steering angles of the plurality of tires 100 (first tire 111, second tire 112, and third tire 113), and three transmission units 350 each configured to transmit the driving force of the actuator to the tire holding unit (first tire holding unit 321, second tire holding unit 322, and third tire holding unit 323), respectively.

As described above, the tire tester 1D according to the fourth embodiment is configured such that when the motors of the tire rotating device 300 are driven and the belt 303 rotates, the first tire 111, the second tire 112, and the third tire 113 are caused to rotate. Further, when the actuator is driven to turn the first tire 111 only, a load such as a lateral force F9 (see FIG. 13) acts on the first tire 111.

Further, the belt 303 is rubbing with the first tire 111, so that when the first tire 111 is steered, a lateral component force (force parallel to the axes of rotation of the drums) F10 (see FIG. 13) is generated as a reaction force.

Figure 13:
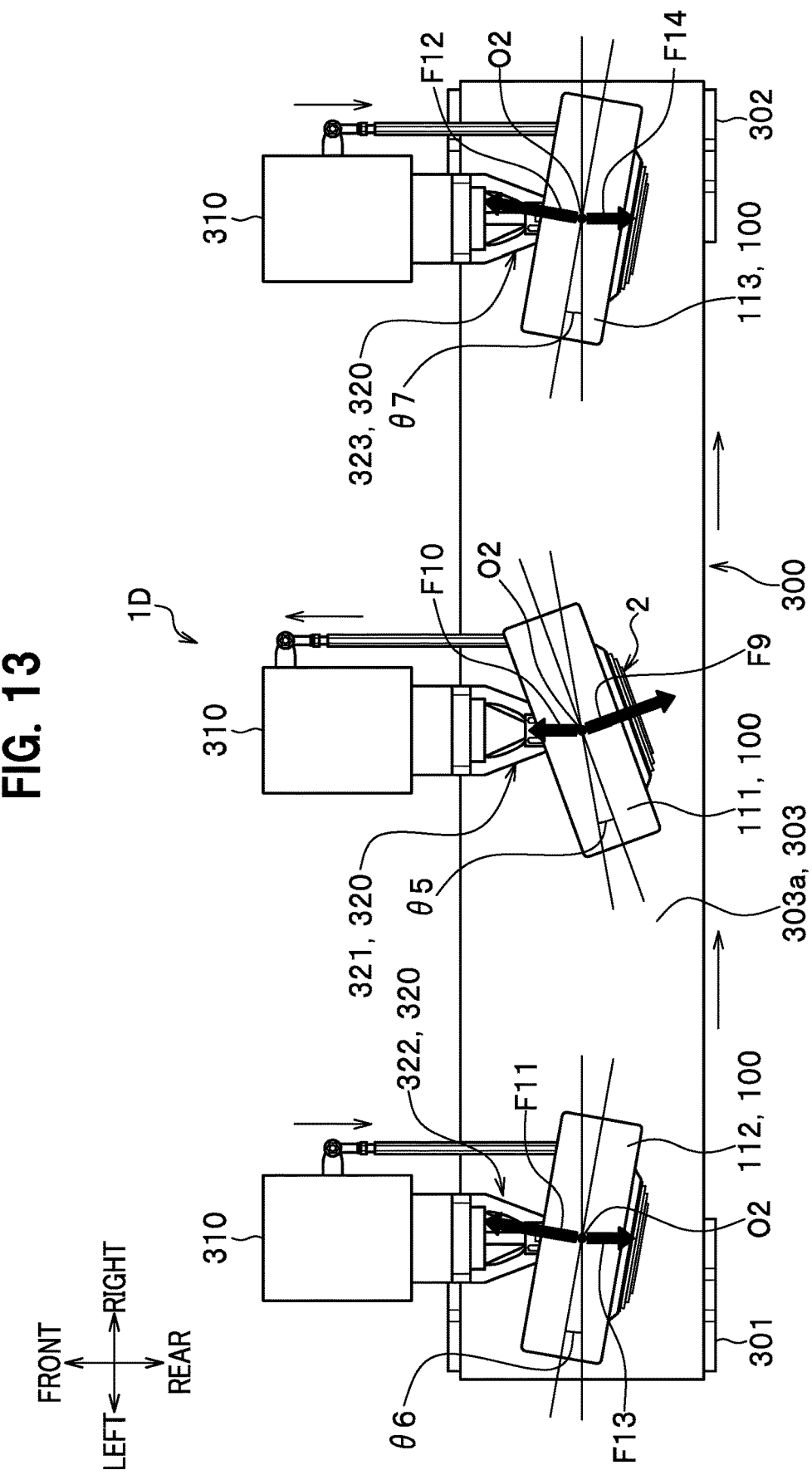
FIG. 13 is a top view of the tire tester according to the fourth embodiment showing a state in which three actuators are driven.

If the lateral component force (force parallel to the axes of rotation of the drums) F10 generated on the belt 303 is large and there may be a possibility that the belt 303 moves along the drums (left drum 301 and right drum 302) and becomes misaligned or comes off the drums, as seen in FIG. 13, the second tire 112 and the third tire 113 are steered.

This makes it possible to generate the lateral forces F11, F12 on the second tire 112 and the third tire 113, so that forces F13, F14 parallel to the axes of rotation of the drums are generated as reaction forces.

The second tire 112 and the third tire 113 are steered in a direction opposite to the direction of the first tire 111. Accordingly, the force F10 generated on the belt 303 and the forces F13, F14 are directed in the opposite directions to each other in the front-rear direction.

Further, the steering angle θ6 of the second tire 112 and the steering angle θ7 of the third tire 113 are set at half the steering angle θ5 of the first tire 111. Accordingly, the resultant of the forces F13, F14 has a magnitude equal to the magnitude of the force F10.

With this configuration, the forces F10, F13, F14 generated on the belt 303 and parallel to the axes of rotation of the drums are canceled out, so that misalignment of the position of the belt 303 or disengagement of the belt 303 can be suppressed.

Although the tire tester 1D according to the fourth embodiment has been described, the position of belt to which the tire contacts and the number of tires may be changed in the present invention without being limited to examples of the above-described embodiments.

Next, a first modified embodiment in which the position of the tire has been changed, and a second modified embodiment in which the number of tires has beem changed are explained below.

As seen in FIG. 14, a tire tester 1E according to a first modified embodiment includes three tire holding units 320 (first tire holding unit 321, second tire holding unit 322, and third tire holding unit 323) as with the tire tester 1D according to the fourth embodiment.

The first tire holding unit 321 is located in a laterally central portion in the right-left direction, and the first tire 111 is in contact with a laterally central portion of the upper surface 303a of the belt 303.

The second tire holding unit 322 is located leftward of the left drum 301, and the second tire 112 is in contact with the left surface 303b of the belt 303.

The third tire holding unit 323 is located rightward of the right drum 302, and the third tire 113 is in contact with the right surface 303c of the belt 303.

Also according to the tire tester 1E configured as described above, the second tire 112 and the third tire 113 are steered in a direction opposite to the steered direction of the first tire 111, so that the forces generated on the belt 303 and directed parallel to the axes of rotation of the drums can be canceled out to each other. Further, since the left side of the belt 303 is nipped between the second tire 112 and the left drum 301 and the right side of the belt 303 is nipped between the third tire 113 and the right drum 302, the belt 303 is far less likely to become misaligned.

As seen in FIG. 15, a tire tester 1F according to a second modified embodiment includes two tire holding units 320 (outer-peripheral-side tire holding unit 324 and inner-peripheral-side tire holding unit 325).

The outer-peripheral-side tire holding unit 324 is located in a laterally central portion in the right-left direction, and the first tire 111 is in contact with a laterally central portion of the upper surface 303a of the belt 303.

The inner-peripheral-side tire holding unit 325 is located in the laterally central portion in the right-left direction, and the second tire 112 is in contact with a laterally central portion of the upper reverse surface 303d of the belt 303.

Namely, among the plurality of tires 100 held by the plurality of tire holding units 320, at least one tire (second tire 112) is in contact with the inner peripheral surface of the belt 303 and rotates when the belt is driven.

Also according to the tire tester 1F configured as described above, the first tire 111 and the second tire 112 are steered in opposite directions to each other, so that the lateral component forces (forces parallel to the axes of rotation of the drums) generated on the belt 303 can be canceled out to each other. Further, since the upper side of the belt 303 is nipped between the first tire 111 and the second tire 112, the belt 303 is far less likely to become misaligned.

What is claimed is:

1. A tire tester comprising:
   a plurality of tire holding units attached to a self-propelled movable member or to a towed member towed by the movable member and each configured to detachably hold a tire to rotate when the movable member travels;
   a turning lateral acceleration meter for measuring a turning lateral acceleration; and
   one or more load measuring units for measuring a load acting on the tire,
   wherein the plurality of tire holding units comprise a first tire holding unit configured to detachably hold a first tire to rotate, and one or more second tire holding units each configured to detachably hold a second tire to rotate,
   wherein each of the one or more second tire holding units holds the second tire to generate a force opposite to a lateral component force generated by steering the first tire, and
   wherein the tire holding units are arranged such that at least one tire holding unit is disposed on each right and left side of the movable member or the towed member with respect to a center line passing through a lateral center of the movable member or the towed member.

2. The tire tester according to claim 1, wherein the plurality of tire holding units are arranged symmetrically with respect to the center line.

3. The tire tester according to claim 1, further comprising one or more actuators for changing a steering angle of the tire.

4. The tire tester according to claim 3, wherein a toe angle of the tire is changed by driving the one or more actuators.

5. The tire tester according to claim 1, wherein the tire holding unit includes a camber angle changing unit capable of changing a camber angle.

6. The tire tester according to claim 1, further comprising a steering angle meter capable of measuring a steering angle of the tire.

7. The tire tester according to claim 6, wherein the steering angle meter is a toe angle meter for measuring a toe angle.

8. The tire tester according to claim 1, further comprising a temperature sensor for measuring a surface temperature of the tire.

9. The tire tester according to claim 1, wherein the tire holding unit includes a drive mechanism for driving the tire.

10. The tire tester according to claim 1, wherein the tire holding unit includes a braking mechanism for applying a braking force to the tire.

11. A tire tester comprising:
    a plurality of tire holding units attached to a self-propelled movable member or to a towed member towed by the movable member and each configured to detachably hold a tire to rotate when the movable member travels;
    an actuator for generating a driving force;
    a transmission unit configured to transmit the driving force of the actuator to the tire holding units,
    wherein the plurality of tire holding units comprise a first tire holding unit configured to detachably hold a first tire to rotate, and one or more second tire holding units each configured to detachably hold a second tire to rotate,
    wherein each of the one or more second tire holding units holds the second tire to generate a force opposite to a lateral component force generated by steering the first tire,
    wherein one of the first tire holding unit and the second tire holding unit constitutes a right tire holding unit attached to a right side of the movable member or the towed member with respect to a center line passing through a lateral center of the movable member or the towed member and configured to hold a right tire,
    wherein the other one of the first tire holding unit and the second tire holding unit constitutes a left tire holding unit attached to a left side of the movable member or the towed member with respect to the center line and configured to hold a left tire,
    wherein the right tire holding unit includes a right toe angle adjusting unit capable of adjusting a toe angle of the right tire,
    wherein the left tire holding unit includes a left toe angle adjusting unit capable of adjusting a toe angle of the left tire, and
    wherein the transmission unit comprises a right link portion connected to the right toe angle adjusting unit and a left link portion connected to the left toe angle adjusting unit; and
    a load measuring unit interposed at least between the right tire holding unit and the right tire or between the left tire holding unit and the left tire and configured to measure a load applied to the tire.

12. The tire tester according to claim 11, wherein the right tire holding unit and the left tire holding unit are arranged symmetrically with respect to the center line passing through the lateral center of the movable member or the towed member.

13. The tire tester according to claim 11, wherein the actuator is disposed on the center line passing through the lateral center of the movable member or the towed member.

14. The tire tester according to claim 13, wherein the actuator is disposed on a lower side of the movable member or the towed member.

15. The tire tester according to claim 11, further comprising a temperature sensor disposed at least on a right side or on a left side of the movable member or the towed member and configured to measure a surface temperature of the tire.

16. The tire tester according to claim 11, wherein the right link portion and the left link portion move laterally in opposite directions to each other by driving the actuator.

17. The tire tester according to claim 16, wherein toe angles of the tires change when the right link portion and the left link portion are moved.

18. A tire tester comprising:
    a plurality of tire holding units attached to a self-propelled movable member or to a towed member towed by the movable member and each configured to detachably hold a tire to rotate when the movable member travels;
    an actuator for generating a driving force;
    a transmission unit configured to transmit the driving force of the actuator to the tire holding units,
    wherein the plurality of tire holding units comprise a first tire holding unit configured to detachably hold a first tire to rotate, and one or more second tire holding units each configured to detachably hold a second tire to rotate, wherein each of the one or more second tire holding units holds the second tire to generate a force opposite to a lateral component force generated by steering the first tire, wherein one of the first tire holding unit and the second tire holding unit constitutes a right tire holding unit attached to a right side of the movable member or the towed member with respect to a center line passing through a lateral center of the movable member or the towed member and configured to hold a right tire, wherein the other one of the first tire holding unit and the second tire holding unit constitutes a left tire holding unit attached to a left side of the movable member or the towed member with respect to the center line and configured to hold a left tire, wherein the right tire holding unit includes a right toe angle adjusting unit capable of adjusting a toe angle of the right tire, wherein the left tire holding unit includes a left toe angle adjusting unit capable of adjusting a toe angle of the left tire, and wherein the transmission unit comprises a right link portion connected to the right toe angle adjusting unit and a left link portion connected to the left toe angle adjusting unit; and a toe angle meter disposed at least at the right tire holding unit or at the left tire holding unit and configured to measure a toe angle of the tire.

\* \* \* \* \*